US009967172B2

(12) United States Patent
Kao et al.

(10) Patent No.: US 9,967,172 B2
(45) Date of Patent: May 8, 2018

(54) METHODS AND SYSTEMS FOR CONTENT LOADING AND OFFLOADING TO AND FROM A TRANSPORTATION VEHICLE

(71) Applicant: Panasonic Avionics Corporation, Lake Forest, CA (US)

(72) Inventors: Chiayu Kao, Irvine, CA (US); George Dawson, San Clemente, CA (US); Christopher VandenBerg, Fullerton, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 106 days.

(21) Appl. No.: 15/290,420

(22) Filed: Oct. 11, 2016

(65) Prior Publication Data
US 2018/0102964 A1 Apr. 12, 2018

(51) Int. Cl.
*H04L 12/26* (2006.01)
*H04L 12/729* (2013.01)
*H04L 29/08* (2006.01)

(52) U.S. Cl.
CPC ........ *H04L 45/125* (2013.01); *H04L 43/0876* (2013.01); *H04L 67/06* (2013.01); *H04L 67/12* (2013.01)

(58) Field of Classification Search
CPC ... H04L 45/125; H04L 67/06; H04L 43/0876; H04L 67/12
See application file for complete search history.

(56) References Cited

U.S. PATENT DOCUMENTS

| | | | | |
|---|---|---|---|---|
| 6,192,416 B1* | 2/2001 | Baxter | .................... | H04L 63/08 707/999.202 |
| 6,671,589 B2 | 12/2003 | Holst et al. | | |
| 7,835,734 B2* | 11/2010 | Eckert | ................ | H04B 7/18506 340/945 |
| 7,984,190 B2* | 7/2011 | Rhoads | .................... | H04L 67/06 709/248 |
| 8,116,797 B2* | 2/2012 | Brady, Jr. | ............... | H04W 4/02 370/310 |

(Continued)

OTHER PUBLICATIONS

Wikipedia article for Dropbox; https://en.wikipedia.org/wiki/Dropbox_(service).

*Primary Examiner* — Afshawn M Towfighi
(74) *Attorney, Agent, or Firm* — Klein, O'Neill & Singh, LLP

(57) ABSTRACT

Methods and systems for a transportation vehicle are provided. One exemplary method includes generating by a processor a master instruction set with a routing plan for loading data to and from a transportation vehicle using one or more networking links; creating by the processor a transportation side instruction set for loading and offloading data from the transportation vehicle, the transportation side instruction set being based on the master instruction set; using the master instruction set, the local instruction set and the transportation side instruction set to automatically load data to and from the transportation vehicle using the one or more network links to meet an objective of the master instruction set; and monitoring data loading to and from the transportation vehicle for making any changes to meet an objective of the master instruction set based on delivery time, cost or both delivery time and cost.

20 Claims, 21 Drawing Sheets

(56) References Cited

U.S. PATENT DOCUMENTS

| | | |
|---|---|---|
| 8,401,021 B2 | 3/2013 | Buga et al. |
| 8,671,432 B2 | 3/2014 | Frisco et al. |
| 8,934,893 B2 | 1/2015 | Lauer |
| 9,668,109 B2 | 5/2017 | Bourlas et al. |
| 9,692,501 B1 | 6/2017 | Mitchell et al. |

* cited by examiner

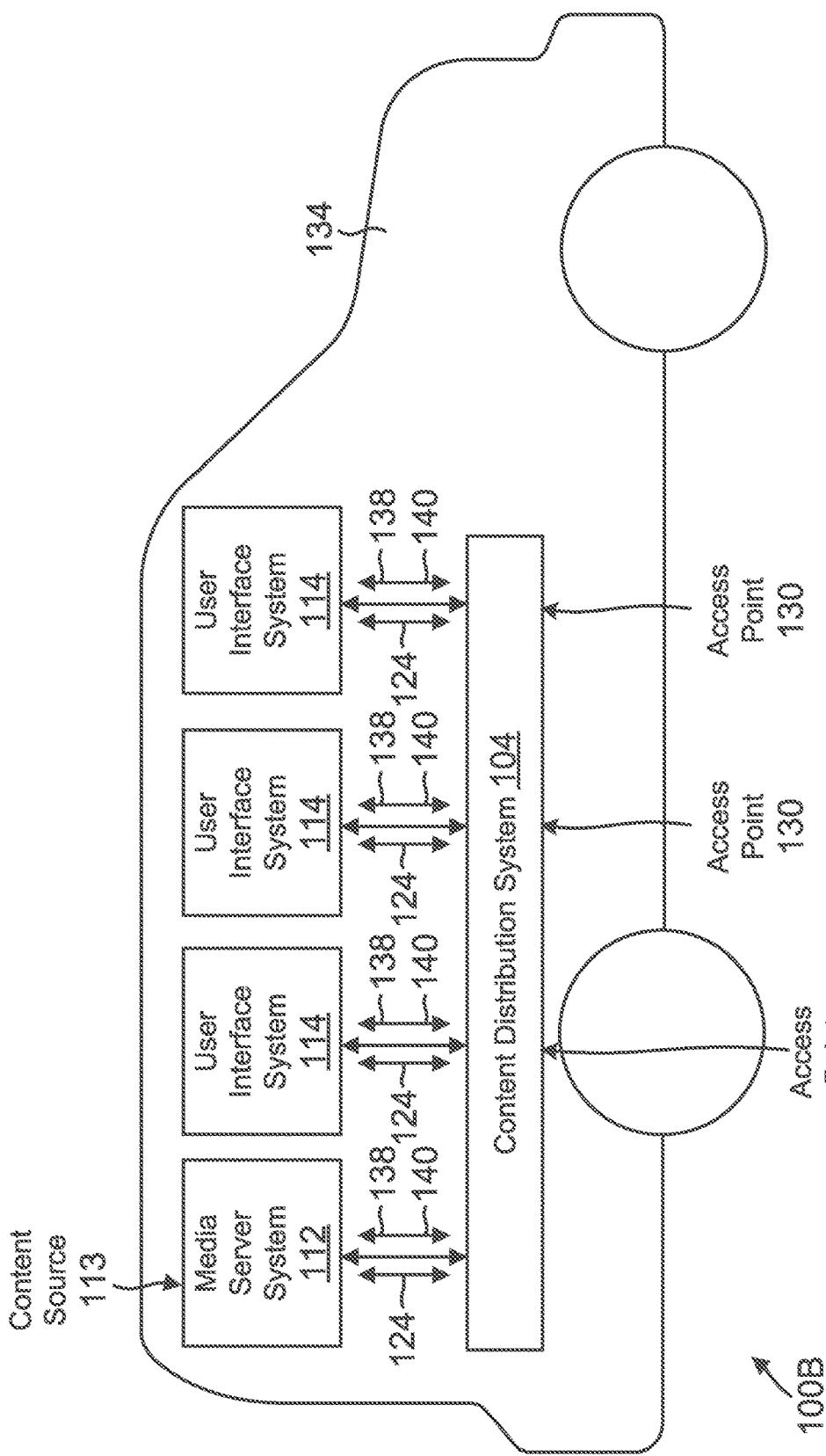

METHODS AND SYSTEMS FOR CONTENT LOADING AND OFFLOADING TO AND FROM A TRANSPORTATION VEHICLE

TECHNICAL FIELD

The present disclosure relates to managing data loading and offloading to and from transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by the passenger, such as adjustable seats, adjustable environmental controls, adjustable lighting, telephony systems, video and/or audio entertainment systems, crew communication systems, and the like. Many commercial airplanes today have individualized video and audio entertainment systems, often referred to as "inflight entertainment" or "IFE" systems. Such systems may also be referred to as "inflight entertainment and communication" systems as well, and typically abbreviated as "IFEC" systems.

Loading electronic data to transportation vehicles and from transportation vehicles can be challenging due to the mobile nature of the vehicles moving in and out of airports, train terminals, bus terminals, shipping terminals and others. Continuous efforts are being made to efficiently and securely, load and offload data from transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 1B shows an example of the operating environment on a non-aircraft transportation vehicle type, according to one aspect of the present disclosure;

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
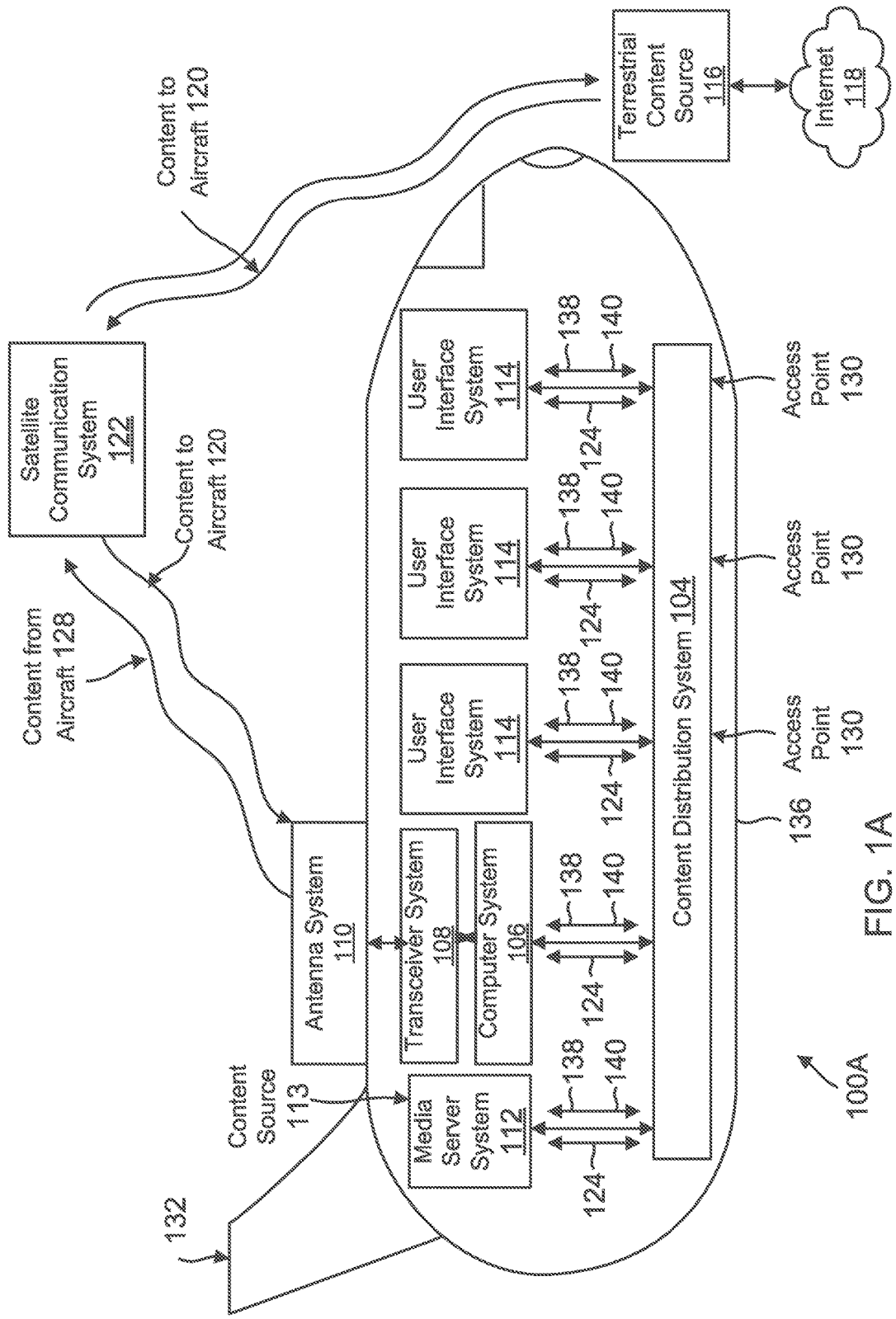
FIG. 1A shows an example of an operating environment for implementing the various aspects of the present disclosure on an aircraft.

Vehicle Information System:

FIG. 1A shows an example of a generic vehicle information system 100A (also referred to as system 100A) that can be configured for installation aboard an aircraft 132, according to one aspect of the present disclosure. When installed on an aircraft, system 100A can comprise an aircraft passenger in-flight entertainment (IFE) system, such as the Series 2000, 3000, eFX, eX2, eXW, and/or any other inflight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118.

Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 and provide the content 120, as processed by the transceiver system 108, to a computer system 106 of system 100A. The computer system 106 can provide the received content 120 to the media (or content) server system 112 and/or directly to one or more of the user interfaces 114 including a personal electronic device as viewing content 124, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system. In at least one embodiment, the user interface system 114 comprises a software application that a user downloads and installs on a personal electronic device (PED) to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, a Wi-Fi connection or for any other reason, payment information likewise can be entered via the input system. The input system can be provided in any conventional manner and typically includes a touch screen, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
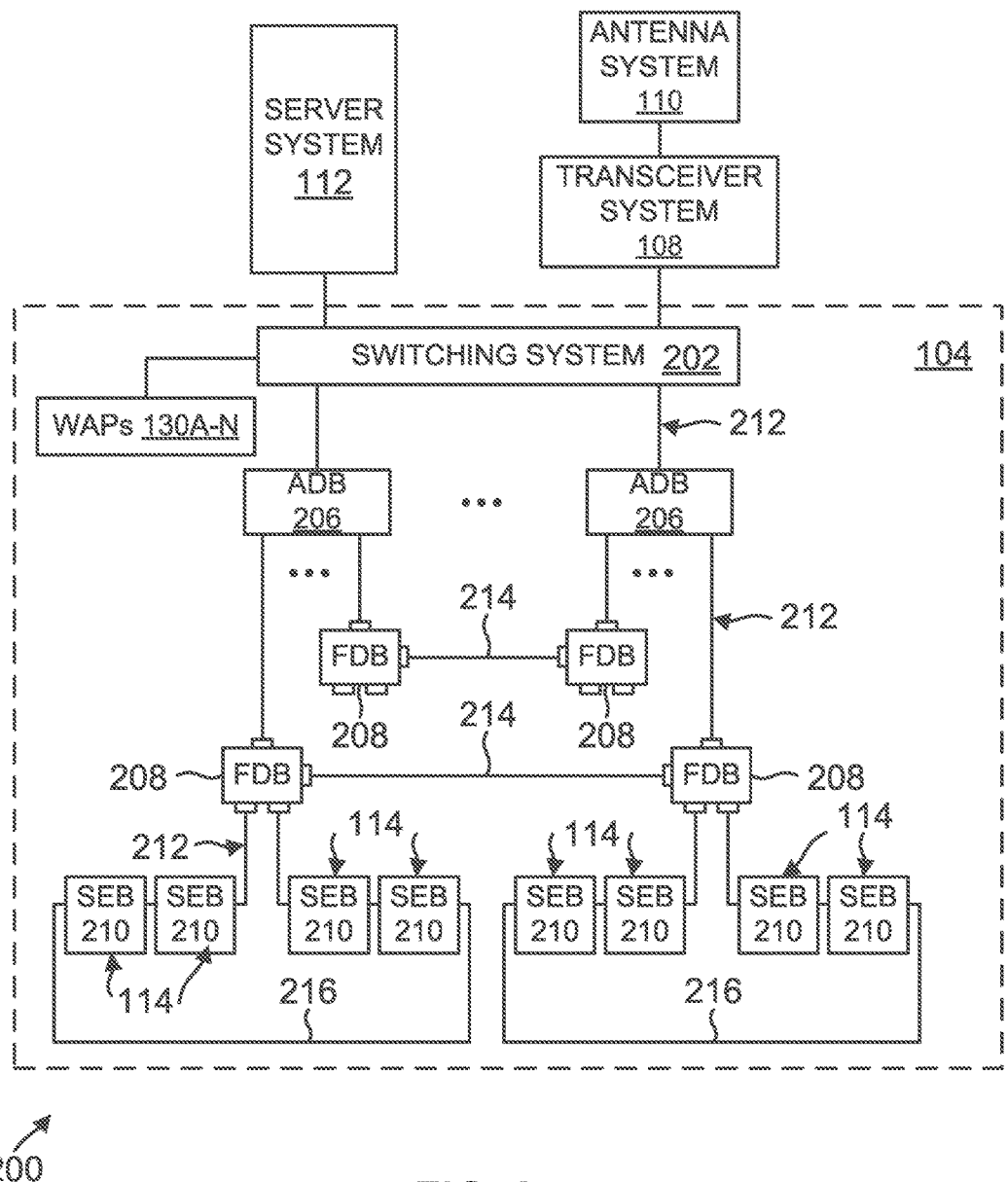
FIG. 2 shows an example of a content distribution system for an aircraft, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
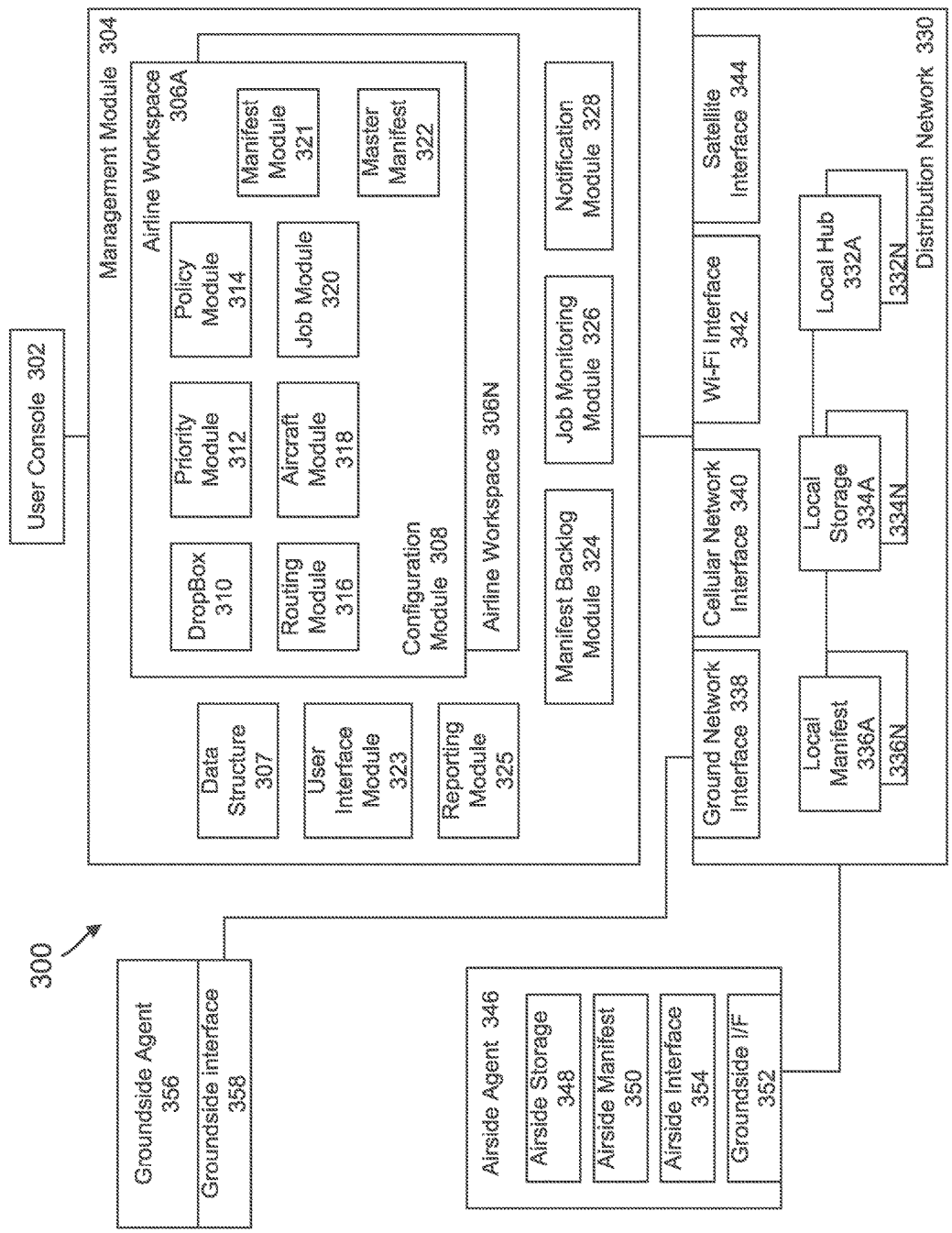
FIG. 3A shows a block diagram of a system for loading and offloading data to and from an aircraft, according to one aspect of the present disclosure.

System 300:

FIG. 3A shows a block diagram of a distribution system 300 (may also be referred to as system 300), according to one aspect of the present disclosure. It is noteworthy that system 300 is described in the context of aircraft and airport terminals but the innovative technology of system 300 is not limited to aircraft/airports and may be adapted and used at train terminals, shipyards, bus terminals and other transportation mechanisms.

In one aspect, system 300 provides innovative technology that efficiently automates delivery of different data types to various aircraft as well as offload data from the aircraft in a systematic manner. System 300 is integrated with hardware/software on aircraft as well as with groundside networks, described below in more detail. System 300 provides technology for efficiently planning, executing and monitoring data transfer jobs. System 300 executes one or more modules for creating data transfer manifests and network delivery jobs based on specific approval policies. The system is configured to select an optimum route from among a plurality of routes based on time/cost/resource utilization. System 300 is enabled for monitoring manifest execution and distribution network status in real-time, as aircraft fly in and out of airports, as described below in more detail.

System 300 includes a user console 302 that may be a desktop computer, a laptop computer, a notebook, a mobile device, a tablet or any other computing device. The user console 302 may be associated with or managed by an airline administrator that is coupled to a management module 304 (may also be referred to as module 304). In one aspect, the management module 304 includes one or more processing logic executing instructions out of a memory for implementing various functional blocks described herein. In one aspect, the management module 304 may be an enterprise level server that executes or interfaces with various applications, for example, planning, monitoring and execution applications with remote access.

In one aspect, the management module 304 interfaces with a distribution network 330. The distribution network 330 is a logical entity having various physical/logical components, including network interface, storage devices, computing devices and other components. In one aspect, the distribution network 330 includes various network interface where each network interface is configured to operate as a distribution point. The distribution point may be registered as a local hub and partitioned for different airlines, as described below. In one aspect, a maximum and minimum transfer rate between two distribution points may be configured to efficiently use network resources and meet airline demands.

In one aspect, the distribution network 330 includes a ground network interface 338 that enables network communication between airline ground systems (for example, an airport kiosk, airline cargo system and others) using a wired connection. A cellular network interface 340 may be used to transfer data to and from an aircraft using cellular modems (for example, 2G/3G/4G or any other type of modem). The cellular network coverage for a fleet may vary based on network accessibility at different geographic regions.

The distribution network 330 also includes a Wi-Fi interface 342 to transfer data using a Wi-Fi connection. As an aircraft arrives at a gate, an aircraft wireless unit scans for available Wi-Fi access points to establish connectivity after proper authentication. The distribution network 330 may further include a satellite interface 344 that may be used to transfer data via a satellite. When in allowed airspace, an aircraft may enter a satellite network and establish connectivity for data transfer after proper authentication.

The distribution network 330 includes local distribution hubs 332A-332N (referred to as hub 332 or local hub 332) with local storage 334A-334N (referred to as local storage 334). A local hub may be any computing device operating within the distribution network, including a PED, tablet, laptop, desktop, notebook or any other device type. The local hub 332 and local storage 334 are used as distribution points for data transfer to and from aircraft, as described below in more detail. Each local hub 332 is configured to process concurrent requests from the management module 304 as well as the aircraft through an airside agent, also described below. In one aspect, a local hub may be added to a network and assigned to an airline workspace described below, or removed from the workspace.

In one aspect, the distribution network 330 also stores local manifests 336A-336N (may be referred to as 336) that are based on a master manifest, described below in more detail.

In one aspect, system 300 includes an airside agent 346 that may be a software application executed by a computing system at the aircraft. The airside agent 346 may be installed at any aircraft system, including media server system 112, computer system 106, user interface system 114 or any other system. The airside agent 346 provides an interface to authenticate an aircraft when requesting connectivity to a ground network and/or receive data from the ground network. The airside agent 346 provides access to temporary storage when an interface to ground or an aircraft network is unavailable.

The airside agent 346 includes airside storage 348 and an airside manifest 350. The airside storage 348 is allocated as part of airside system installation and may include any type of storage device, including hard drives, solid state drives or any other storage device type. The airside manifest 350 is an aircraft specific manifest, described below in more detail that is derived from a master manifest.

A ground communication interface 352 on the airside communicates with ground networks while an airside interface 354 is used to interface with aircraft hardware and software systems. In one aspect, the airside agent 346 is configured with network access to an airport Wi-Fi network, a cellular network, and/or a satellite network. The airside agent 346 stores profile data to identify an aircraft when establishing a connection with the ground network. The airside agent 346 also stores data to authenticate the aircraft when establishing transfer sessions. The airside agent 346 automatically prioritizes transfer sessions based on priority levels applied to the airside manifest 350.

The airside interface 354 is notified when data is available for transfer. Data that can be loaded to an aircraft may also be referred to as a loadable file throughout this specification. The airside interface 354 retrieves the loadable files and distributes data to other airside systems. The term file in this context includes any structured or unstructured data.

The distribution network 330 also communicates with a groundside agent 356 that has a ground side interface 358. The groundside agent 358 is installed on an airline system, for example, a server, a PED, laptop, notebook, desktop or any other computing device. The groundside agent 358 may be used to move data to an aircraft or receive data from an aircraft, using system 300 components, as described below in more detail.

Referring back to the management module 304, in one aspect, the management module 304 provides dedicated workspace 306A-306N (may be referred to as workspace 306) for a plurality of airlines. The airline workspace 306 enables the management module 304 to efficiently manage airline accounts. In one aspect, role based access control is used for accessing an airline workspace. For example, user roles may be defined as "content provider", "task scheduler", account manager", "task approver" "system administrator" or any other role.

As an example, an account manager authorizes airline fleet and ground system configuration information to an airline workspace. This includes aircraft configuration data, flight routes, cabin information or any other information.

A task approver receives notification when data is scheduled for distribution to an aircraft. The task approver provides the appropriate approval level based on the media type. A task scheduler generates manifest and monitors execution status. The task scheduler may receive work orders from account managers and content providers. A content provider manages stored data for distribution. Airlines and other third parties are assigned this role to upload data to a dropbox.

A system administrator is typically provided complete access to manage user operations. The system administrator using a computer console may setup airline workspace, authorize users and configure a routing network. It is noteworthy that the foregoing roles are simply described as examples. The various adaptive aspects are not limited to any specific definition for a role. Roles may be added or deleted based on different operating environments.

Referring back to FIG. 3A, the management module 304 includes a configuration module 308 to configure various components within system 300. The configuration module 308 may include or interface with various applications, for example, a dropbox module 310, a priority module 312, a policy module 314, a routing module 316, an aircraft module 318, a job module 320 and a manifest module 321 that generates a master manifest 322. It is noteworthy that the various functional blocks are shown for clarity as an example. The adaptive aspects of the present disclosure may be enabled by combining the various modules.

In one aspect, different type of information may be loaded to an aircraft or offloaded from an aircraft. The information may be referred to as payload. Information that is loaded onto an aircraft (i.e. loadable file) includes media, for example, audio/video files, supporting data files and metadata for an IFE. This may also include public broadcast data. The media loadable files may be loaded on a recurring basis, monthly, weekly or daily to refresh IFE content. Software may also be loaded as binary data to update or troubleshoot operation software on the aircraft. The software loadable file may be loaded on-demand. Other type of data that may be loaded includes configuration data to customize software, application data to update passenger application content, for example, mapping application.

Data offloaded from an aircraft includes data generated by aircraft applications and systems, for example, records of passenger usage of an IFE system and application content, payment data and other transaction information. It is noteworthy that the adaptive aspects described herein are not limited to any specific data type loaded to an aircraft or offloaded from an aircraft.

The dropbox module 310 is configured to create a "dropbox", a logical container for receiving a file. The dropbox is a virtual interface that is assigned to an airline workspace for receiving files from a source container. The source container may be another virtual entity. Each dropbox is assigned a priority level for moving data contained by the dropbox. In one aspect, each dropbox is a temporary network link to store loadable file data. In one aspect, a dropbox is dedicated to an airline. In another aspect, the dropbox may be shared between airlines. In one aspect, the dropbox module 310 enables creation of a child dropbox that is associated with a parent dropbox.

The priority module 312 is used to manage priority for moving data across different devices based on different data types. Various priority levels may be used, for example, level 1 (low), level 2 (normal) and level 3 (critical). A default priority may be assigned for a selected aircraft/aircraft group. In one aspect, the priority module 312 enables change in priority levels of a payload type, either temporarily or permanently.

In one aspect, a policy module 314 is provided for configuring approval policies for data transfer to and from an aircraft. The policies may have various tiers, for example, tier 1, where no notification is required, tier 2 where email notification is needed and tier 3 where a digital signature has to be used for data transfer. In one aspect, a default policy is associated with each dropbox when an airline workspace is created. The default policy may be changed. When multiple approval policies are associated with an aircraft, then the highest policy is used to execute a job. In one aspect, approval policy may be applied to an entire fleet, an aircraft group or a specific aircraft.

In one aspect, a routing module 316 may be used to configure routing options for loading or offloading data from aircraft. The routing options are associated with each airline workspace to use best efforts for using available network links, shortest time using all network links, as well as least cost based on user defined cost thresholds. To provide best efforts, a link is automatically selected based on current traffic load. For the shortest time, historical (for example, average bandwidth available at a certain time of the day) information and airline operational data is used to compute the shortest time.

In one aspect, an aircraft configuration module 318 is used to configure aircraft and aircraft groups for receiving data and/or offloading data. The aircraft module 318 may be used to create an aircraft group that is uniquely identified and has more than one aircraft. The aircraft module 318 also enables input of aircraft configuration information. In one aspect, the configuration information includes an aircraft identifier (for example, registration number (tail ID)), model type, and subtype (e.g., Boeing 737, subtype 200 ER) (without derogation of any third party trademark rights), airline information, aircraft system information (hardware and software information), flight route, and cabin class information. The aircraft module 318 enables adding a new aircraft to a group or removing the aircraft from the group.

The aircraft module 318 may also be used to configure a recipient of data offloaded from the aircraft. In one aspect, to configure a recipient, an authorized user provides a recipient identifier, name of the system (i.e. the ground system), ownership information (airline, manufacturer and others), a network address, storage limits and contact information for an administrator. In one aspect, a default storage location may be specified for any offloaded data. A dedicated dropbox in an airline workspace is also provided for the offloaded data. An external system, using an API (application programming interface) may access the offloaded data upon proper authorization.

In one aspect, a manifest module 321 is provided to create a manifest for an airline. The manifest may be stored as a master manifest 322. Based on the master manifest, local manifest 336 and airside manifest 350 are generated. The term manifest as used herein defines a set of commands for distributing data to one or more recipients. The master manifest 322 identifies data files that airside and groundside agents 346 and 356, respectively, should receive. The master manifest 322 is used to generate a set of instructions for assignments to deliver data by the job module 320.

The local manifest 336 is a local copy of the master manifest 322 reduced to a set of instructions by the job module 320 for a local hub to operate as a data staging node for incoming and outgoing aircraft. The aircraft manifest 348 is an aircraft specific copy of the master manifest 322 that defines data transfer for a specific aircraft. The aircraft manifest 346 identifies files an aircraft may have at any given time and is updated to track data that is loaded to the aircraft based on synchronization with the master manifest 322.

In one aspect, the master manifest 322 includes a first segment for distribution of loadable files and a second segment for offloading data from aircraft. The manifest fields may be modified into assignments by the job module 320.

For generating a distribution assignment (i.e., data that is loaded onto aircraft) by the job module 320, a user selects one or more loadable files for distribution. A source container is also selected for the loadable files. An aircraft group is selected for loadable recipients. One or more aircraft is added for the assignment. A dropbox for the assignment is selected. A draft assignment is then created with an assignment identifier (assigned when the assignment is created), assignment name, type (i.e. one-time, recurring), the source container, recipient's identifiers, a route, priority, any approval policy, delivery date and time, and a user contact. The assignment attributes may be configured and customized. In one aspect, a default route and priority may be assigned when the assignment is created. The default values may be changed by an authorized user. For recurring assignments, the date and delivery times are automatically updated.

In one aspect, an assignment to offload data from the aircraft is configured using the job module 320. An aircraft is selected as an offload data source for the assignment. In one aspect, the assignment may be created for an entire aircraft group. Based on the selected aircraft/aircraft group, an offload tag for the aircraft is retrieved from a data structure (not shown). The aircraft is identified as a source for the offload data. A recipient system is identified as the recipient. The offload assignment is then generated which includes an assignment identifier, assignment name, status, type, offload data source, offload data tags, offload recipient, offload dropbox, route, priority level, receive by date/time, notification policy and contact. In one aspect, the offload assignment may be edited by a user including default values (for example, type, route, priority or any other value).

In one aspect, a manifest backlog module 324 manages execution of a plurality of manifests, as described below in more detail. In one aspect, a manifest at a same priority level is assigned resources based on delivery date/time enabling execution of earlier dates before latter dates. In one aspect, manifests for files that are of smaller size (i.e. below a threshold size) with same delivery date/time and priority level are executed first. Different routes may be selected if a transfer cannot be completed on time as described below in more detail.

When a new assignment is received, it is added to a manifest log (not shown by the manifest backlog module 324. The loadable files are added to the log. In one aspect, the manifest backlog module 324 indicates the network resources allocated to execute distribution of data to aircraft and from aircraft for each manifest. When queried, the manifest backlog module 324 returns a list of delivery jobs to fulfill a specific manifest. In one aspect, the manifest backlog module 324 provides a status at a manifest level, including data delivered/offloaded, any scheduling failures or problems, in-process status and other status. If there is a problem with manifest execution, then a job may be submitted again. Details of managing a manifest backlog are provided below.

In one aspect, for each local hub identified in a master manifest, a data transfer session is established by the management module 304. The local hub 332 acknowledges any transfer request to ensure that resources are available for the transfer. A transfer may be paused when the resources are not available, for example, storage space for an airline workspace is reached. Once a transfer session is established with the local hub, data from a source container is transferred to the local storage 334. The delivery status is monitored when the transfer starts. If no loadable file is available at the source container, a contact specified by the master manifest is notified and the manifest is moved to a "problem" queue (not shown) maintained by the management module 304 so that corrective action can be taken.

During the transfer session, the percent received by the hub at any time is indicated. If a network connection is lost, then the transfer is paused and restarted after the connection is established. The local hub stores data at the local storage, until the management module 304 instructs to do otherwise. It is noteworthy that airline data is separately partitioned at the local storage/local hub level.

In one aspect, to manage loadable file data, the management module 304 provides a user interface 323 that enables a user to login. Upon login, the user is able to see what dropboxes the user is able to access. Authorized users are able to add files to a dropbox. The management module 304 classifies a file when it is added to the dropbox. When a file is added for the first time, the management module 304 adds metadata for the file to a metadata structure (not shown) with a file name, type, version, size, permissions and other fields. It is noteworthy that an authorized user may update the attributes of a file.

Based on a source container, the management module 304 may add the content type (for example, media, software and others), a priority, a content provider's name, a task scheduler's name, physical storage location and the status for a loadable file. The management module 304 provides an indicator when a loadable file is being added to a source container with a time stamp.

A job monitoring module 326 (may be referred to as module 326) monitors various jobs for different manifests/airlines. In one aspect, module 326 receives status messages from various network points of system 300. The status and reporting parameters of each network point will depend on the recipient of the status messages and manifest configuration. Details of job monitoring are provided below.

A system notification module 328 provides and manages notifications, in one aspect. The system notification module 328 sends notification to airlines, the management module 304 or any other authorized entity. The notification may be configured as part of a manifest using defined conditions. The notification may include email notifications or any other type based on certain rules, for example, when an aircraft has not connected via a selected network link, failed to transfer data via a specific link. The notification may be based on offload history, for example, when an aircraft fails to provide data per a manifest within a specified duration. The notification may also be based on history of loading data to the aircraft, for example, when data remains on the groundside after a threshold duration, has not completely transferred within a duration or installation failure on the airside. The technology disclosed herein enables a user to setup custom notification schedules and techniques to initiate corrective action.

In one aspect, a notification message sent by the notification module 328 includes payload type, notification identifier, notification event, airline, and aircraft identifiers. File names that are impacted by the notice are provided as well. When a user acknowledges receipt of a notification message, the notification may be removed from a send queue (not shown).

In another aspect, management module 304 also includes a reporting module 325 that generates customized reports, according to one aspect of the present disclosure. In one aspect, performance reports are generated for each airline. The report may provide a total amount of data traffic associated with a plurality of executed manifests. The reporting module 325 may provide a total amount of data transferred over a wireless link and a connection time for each aircraft per network link. For each completed job, the reporting module 325 provides the amount of data transferred and the type of link used within a specified duration. The report module 325 also reports the number of failed jobs within a duration. Details regarding using the reporting module 325 are provided below.

In one aspect, the various modules of management module 304 may store information at various data structures shown as 307. Data structures include various configuration data, performance and monitoring data that is described herein.

Figure 3B:
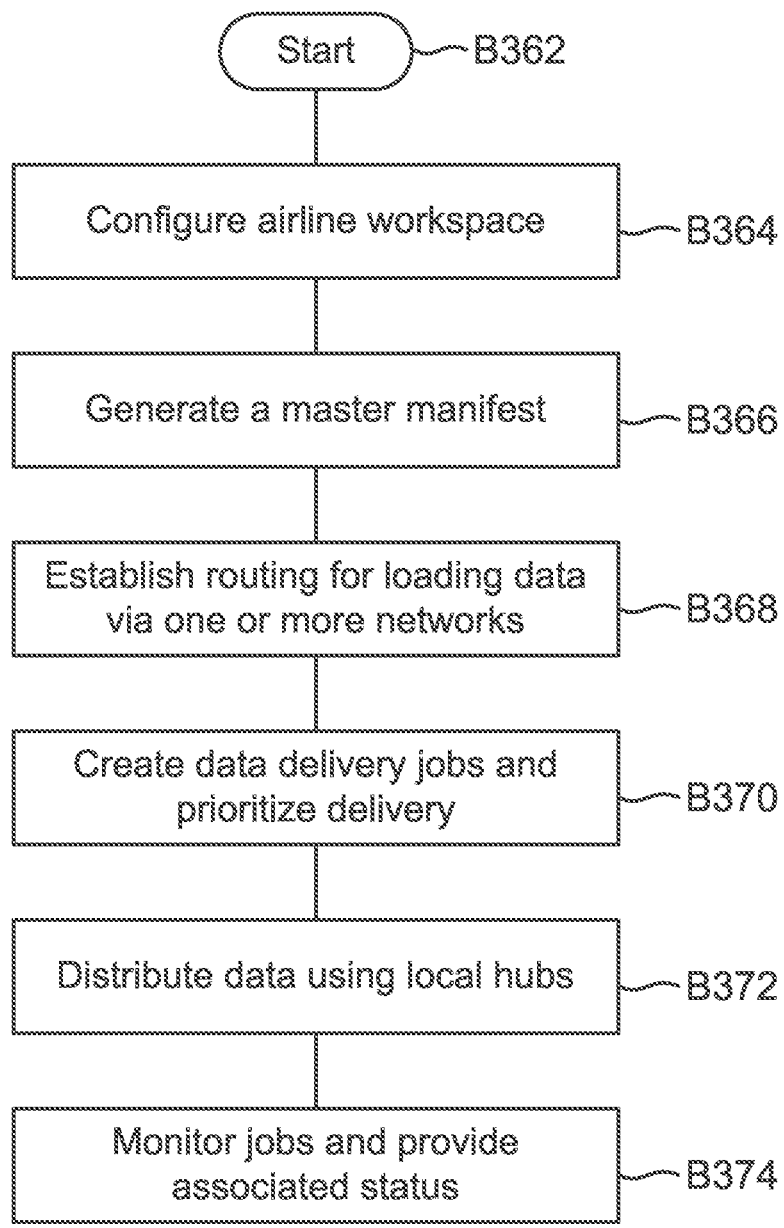
FIG. 3B shows a high-level process executed by the system of FIG. 3A, according to one aspect of the present disclosure.

Process Flows:

FIG. 3B shows a high-level process 360, according to one aspect of the present disclosure. Process 360 that starts in block B362 may be executed using various components of system 300, described above using one or more computing devices. Process 360 is based on innovative computing technology that enables efficient transfer of data to and from aircraft in a dynamic airport setting where aircraft come and go, using one or more computer networks.

In block B364, an airline workspace is configured. Details of block B364 are provided below with respect to FIG. 3D. A master manifest is generated in block B366 and described below in more detail with respect to 4A. Routing is setup in block B368 using one or more computer networks and described below with respect to FIG. 4E.

In block B370, data delivery jobs (or assignments) are created by the job module 320 using local and airside manifests based on a master manifest. Thereafter, data is distributed using local hubs in block B372. The jobs are monitored in block B374 and a status based on the monitoring is provided to an authorized user/system.

Figure 3C:
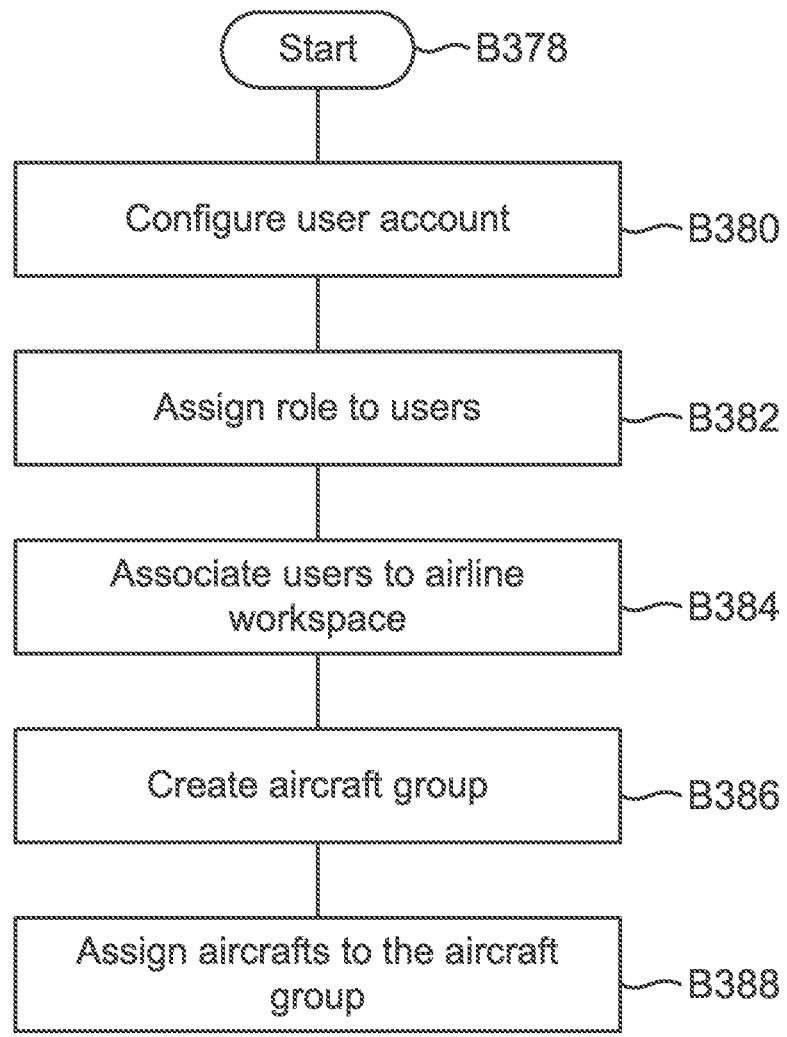
FIG. 3C shows a process for creating a user account, according to one aspect of the present disclosure.

FIG. 3C shows process 376 for configuring an airline account for using the innovative technology of system 300, according to one aspect of the present disclosure. The process blocks of FIG. 3C may be executed by the user console 302 and the management module 304, described above. The process begins in block B378 when a user console is operational. A user interface is presented by the user interface module 323. In block B380, a user account is created. A unique identifier is assigned to the user. In block B382, a role is assigned to the user, for example, task scheduler, task approver, content provider, account manager, system administrator or any other role. In block B384, the user is associated with an airline workspace 306. The process for creating the workspace is described below in more detail.

In block B386, an aircraft group is created and uniquely identified. Aircraft are added to the aircraft group. Each aircraft is also uniquely identified, for example, by a tail Identifier (or tail ID).

Figure 3D:
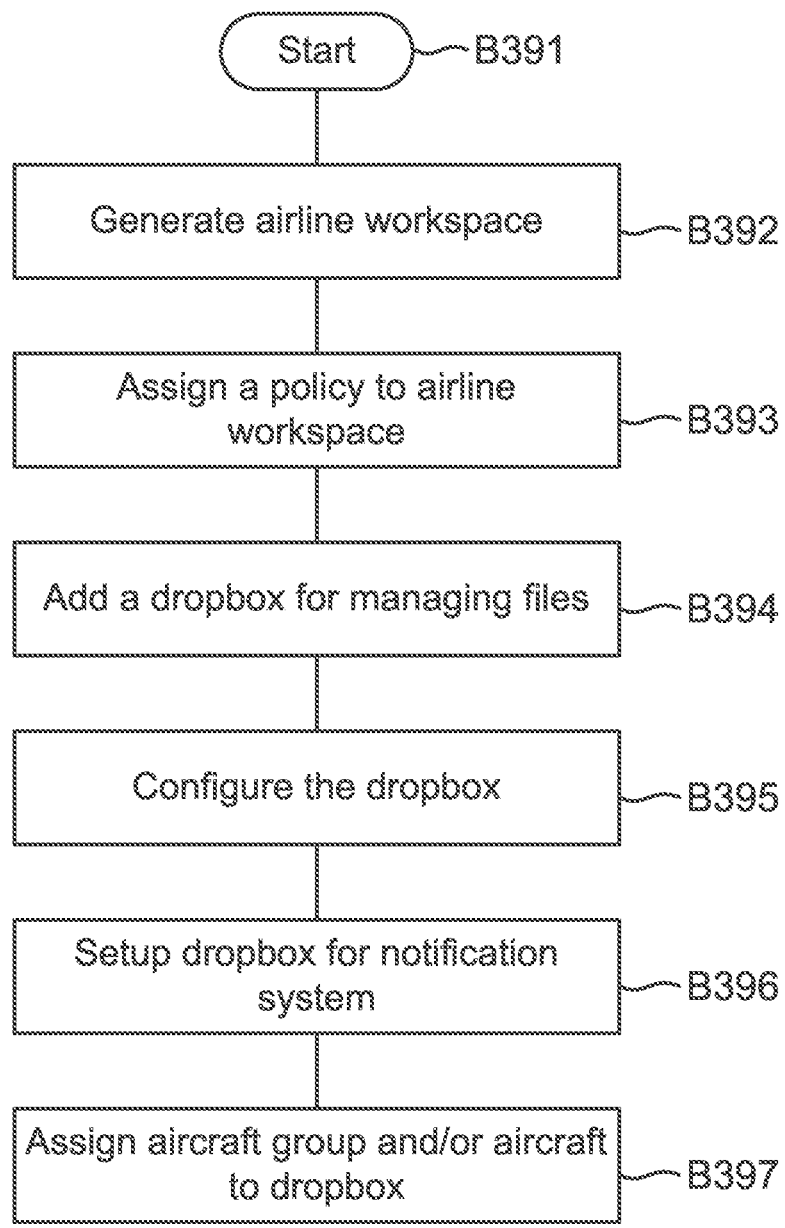
FIG. 3D shows a process for configuring an airline workspace, according to one aspect of the present disclosure.

FIG. 3D shows a process 390 for configuring an airline workspace 306, according to one aspect of the present disclosure. The airline workspace enables an airline to manage data upload to an aircraft and offload from the aircraft, using the innovative technology disclosed herein. The process begins in block B391 after a user account has been created. It is noteworthy that the airline workspace may be created as part of the process used for creating the user account.

In block B392, an airline workspace is partitioned and created by the management module 304. The partition ensures that only an authorized airline user can use the workspace. One or more authorized user accounts with one or more roles may be associated with the airline workspace.

In block B393, an approval policy is assigned to the airline workspace. The approval policy may be that no notification may be required for a task, an email notification is required or a digital signature is required. It is noteworthy that an airline may also create a custom approval policy based on the airline's operating needs.

In block B394, at least one dropbox is assigned to the airline workspace. As explained above, dropboxes are logical containers that are used to stage loadable files. The dropboxes are configured in block B395 for receiving loadable files. The dropboxes may be dedicated for different media types, grouped by a specific approval policy; shared between one or more airlines, associated with child dropboxes; assigned a certain priority level and assigned user controls. The flexibility in configuring the dropboxes enables data transfer to and from aircraft based on airline and airport needs.

In one aspect, in block B396, a notification system is setup for a dropbox. This enables notification to a user, for example, a task scheduler, when the status of the dropbox changes. In block B397, an aircraft group or at least an aircraft is assigned to the dropbox. This ensures that data transferred to and from the aircraft can be tracked efficiently.

Figure 4A:
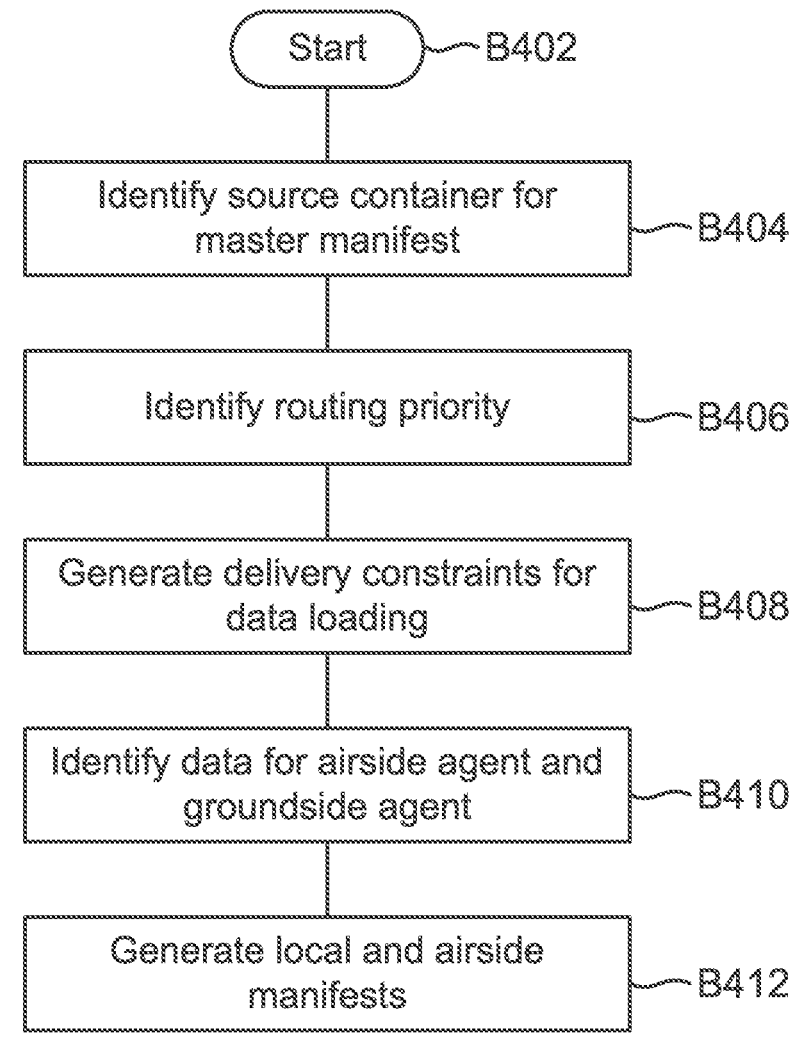
FIG. 4A shows a process for generating a master manifest, according to one aspect of the present disclosure.

FIG. 4A shows a process 400 for generating a manifest using the innovative technology disclosed herein, according to one aspect of the present disclosure. The process begins in block B402 either after an airline workspace has been configured or as part of airline workspace configuration.

In block B404, a source data collection location for a master manifest is identified. In one aspect, the location identifies a source container, a logical object with loadable files that are to be transferred. An aircraft group and/or one or more aircraft are added to the master manifest. In one aspect, the master manifest identifies recipients of loadable files, for example, an aircraft, aircraft group, airline ground service or any other entity. The dropboxes for the manifest are also identified.

In block B406, a routing priority is added for the master manifest. Details of routing setup are provided below with respect to FIG. 4E. An approval policy is also added to the master manifest. In one aspect, a default policy is added to the manifest that can be changed by a user with the appropriate control.

In block B408, delivery constraints for data loading/offloading are identified. This includes identifying a delivery date and time. When the manifest is recurring, the delivery dates/times are automatically updated. Thereafter, in block B410, data that is to be loaded to an airside agent and offloaded to a groundside agent is identified. The master manifest is then uniquely identified, and a user contact is assigned to the manifest. Thereafter, using the master manifest that is uniquely identified by an identifier, in block B412, one or more local manifests are generated for one or more local hubs and an airside manifest is generated for an aircraft. In one aspect, a local hub stores the data files based on the local manifest. The local manifest is updated, when the master manifest is updated, for example, adding new files or deleting old files.

Figure 4B:
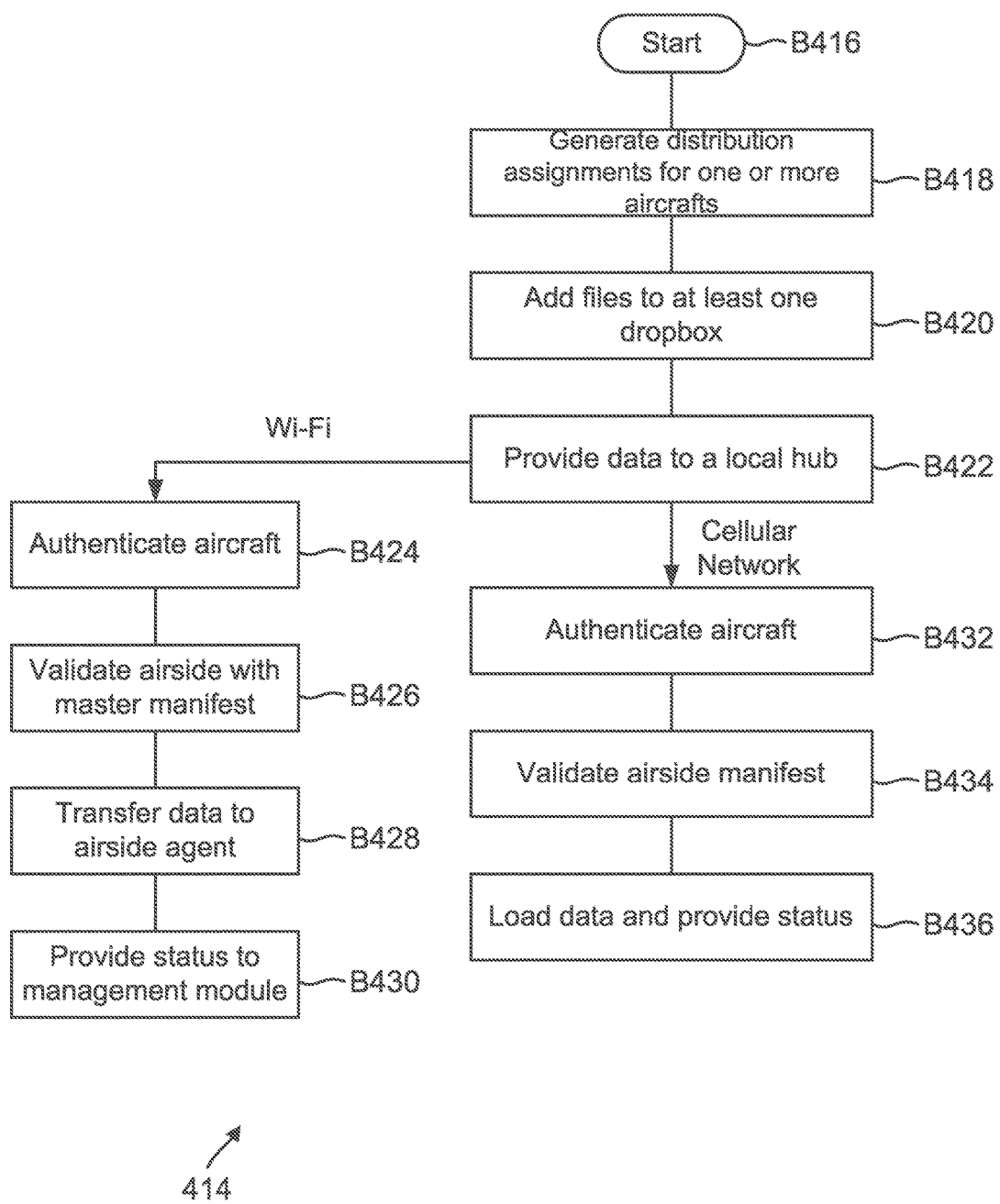
FIG. 4B shows a process for distributing data to aircraft, according to one aspect of the present disclosure.

FIG. 4B shows a process flow 414 for uploading data to an aircraft, based on a manifest, according to one aspect of the present disclosure. The process begins in block B416. In one aspect, in block B418, a distribution assignment is generated by a user, for example, a task scheduler using user console 302. The assignment may be for one aircraft or an aircraft group. A dropbox is allocated to the assignment and in block B420, loadable files are added to the dropbox. It is noteworthy that more than one dropbox may be used based on file type and/or priority.

Based on the assigned airports, in block B422, data from the dropbox is transferred to one or more local hubs 332 and stored at local storage 334. It is noteworthy that one local hub may operate as a regional repository for other hubs. If the master manifest for the assignment is updated, then the local manifest at the local hub is also updated. Transfer to the local hub is based on available network resources. The transfer to a local hub is monitored by the job monitoring module 326, as described below in more detail.

The data from the local hubs may be transferred to the aircraft using different network types, for example, Wi-Fi, cellular, satellite networks and others based on the master manifest/local manifest. The Wi-Fi based distribution is described with respect to block B424-B430, while the cellular transfer described with respect to block B432-B436. Satellite network transfer is described below with respect to FIG. 4C.

In one aspect, a new transfer is initiated when a file has never been received on an aircraft. For previous file transfers, the transfer resumes from a previous transfer session. The airside storage 348 stores loadable files until a complete transfer has occurred.

In block B424, when an aircraft checks into an airport, the aircraft is first authenticated by the airside agent 346 using appropriate security measures. The aircraft is identified as a distribution point within a Wi-Fi network.

In block B426, the airside manifest is compared with the master manifest to validate current data transfer assignment. In block B428, upon validation/synchronization, the data is transferred to the airside agent 346 using a Wi-Fi link. In one aspect, when an aircraft is at a first airport, data may be partially loaded at the first airport. If the loadable files are not critical and the aircraft takes off, then the transfer may be resumed at a second airport. It is noteworthy that time critical media (for example, daily news video updates etc.) is prioritized over other files. Ongoing transfer may be reprioritized in real-time to accommodate higher priority files.

In one aspect, status for a successful or unsuccessful transfer is provided to the management module 304. In one aspect, if connection with the airside is lost, then the manifest associated with the transfer is placed in a problem queue maintained by the manifest backlog 324. The problem queue is created so that appropriate corrective action may be taken for failed transfers.

To transfer data using a cellular network, the aircraft is authenticated in block B432, similar to B424. The airside manifest is validated in block B434, similar to block B426 described above. Data is loaded and a status is provided in block B436, similar to blocks B428 and B430, described above.

Figure 4C:
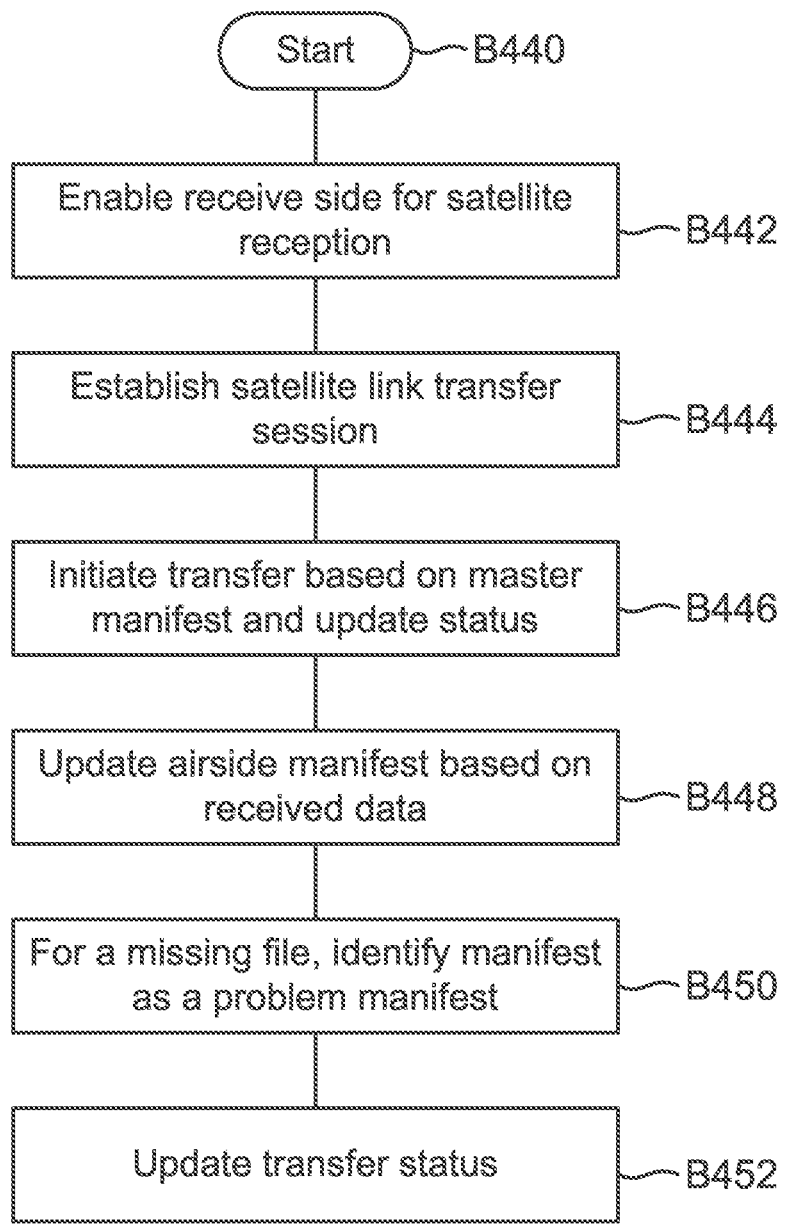
FIG. 4C shows a process for using a satellite network, according to one aspect of the present disclosure.

FIG. 4C shows process 438 for using a satellite network for downloading data to an aircraft in response to an assignment based on a manifest, according to one aspect of the present disclosure. The process begins in block B440. In one aspect, the process may be triggered for downloading time critical files to the aircraft. The process may be triggered while an aircraft is in-flight.

In block B442, the receive side for receiving data from a satellite is enabled. The aircraft is identified as a distribution point within the network. In block B444, a transfer session is initiated based on an existing manifest. In block B446, a new transfer is initiated when the loadable file has not been received by the aircraft before. If received data cannot be associated with the existing manifest, the airside agent tags the data so that the data can be reclaimed/synchronized, when the current manifest is updated. If the loadable file was partially received from a previous session, then the session starts from where the previous session was terminated. Duplicate data is deleted, when received.

In block B448, the airside manifest is updated. This occurs when the transmit side of the satellite communication is enabled, which allows the aircraft to transmit data. After the airside manifest is incremented, the airside agent credits the received files. If a file for a manifest cannot be located, then the manifest is placed in a problem queue in block B450 and processed by the manifest backlog module 324. It is noteworthy that if the transmit connection is lost by the aircraft, the receive transfer session still continues without interruption. The status for the transfer session is updated frequently in block B452.

Figure 4D:
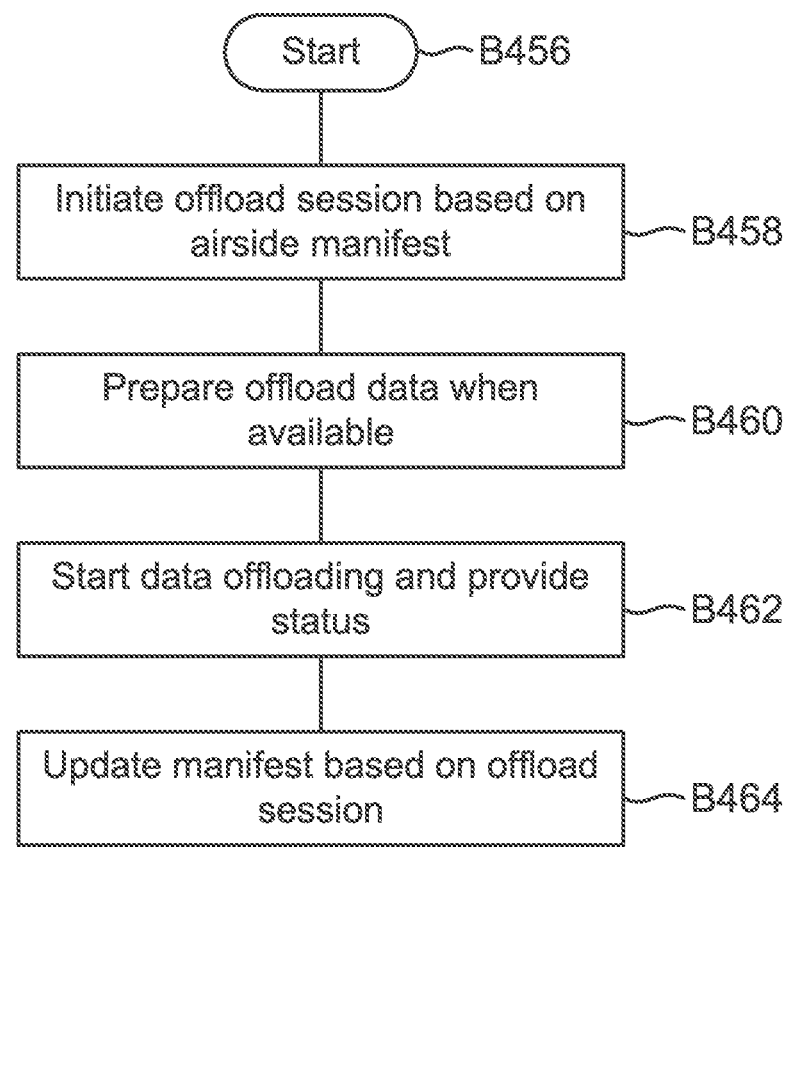
FIG. 4D shows a process for offloading data from an aircraft, according to one aspect of the present disclosure.

FIG. 4D shows a process 454 for offloading data from an aircraft, according to one aspect of the present disclosure. The process begins in block B456. In block B458, an offload session is initiated based on an airside manifest, according to one aspect of the present disclosure. A new session is started when the data on the aircraft has never been offloaded to an offload recipient. If data has previously been partially offloaded, then the offload session starts from where a last transfer stopped.

In block B460, the airside agent 346 prepares data for offload. If no data is available, then airside systems are contacted by the airside agent 346 to retrieve the data that has to be offloaded. If still there is no available data, then the manifest is flagged to indicate that no data is available. The manifest may be moved to a problem queue for handling.

When data is available, then in block B462, data is offloaded to an authorized and configured recipient system. The status for the offload is tracked at a regular interval. Network resources may be reallocated to manage the data offload based on network resource utilization and availability.

The data may be offloaded using a Wi-Fi link, after an aircraft is authenticated. The airside agent 346 updates the airside manifest with the master manifest to identify current offload assignments. Thereafter, the data is retrieved from airside storage and transferred via the Wi-Fi link. The offload session may also use a cellular network for data offload, after the aircraft is authenticated. Furthermore, when the aircraft is enabled to transmit data, the data may be offloaded using a satellite link. In another aspect, the ground network may be used to offload data.

When multiple network links (Wi-Fi, Cellular, Satellite, Ground network links and others) are available for offload, then the offload occurs using a route that is mentioned in the manifest. When all specified links are available, then the default link specified in the manifest is used. If no preference is suggested in the manifest, then the link with the highest throughput is selected. In one aspect, multiple links are used for simultaneous offload, where higher priority data is offloaded using the link with the highest throughput.

In one aspect, when multiple offload sessions are in place, then offload sessions may be reordered to move a higher priority job first. For two connection points, a minimum bandwidth is committed to execute a high priority job. The offload sessions are sequenced based on delivery time, when the priority level is the same.

Thereafter, once the offload is completed, the airside and the local manifests are updated in block B464.

Figure 4E:
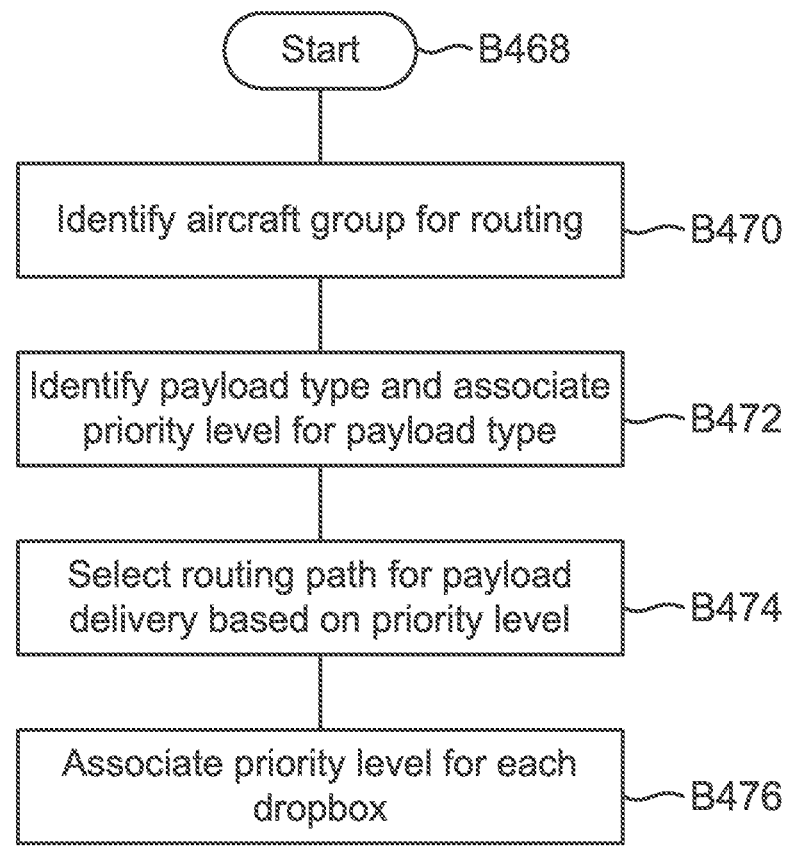
FIG. 4E shows a process for creating a routing path, according to one aspect of the present disclosure.

FIG. 4E shows a process flow 466 for setting up routing for moving data to and from an aircraft, according to one aspect of the present disclosure. The routing is based on control instructions and rules applied to a manifest during a planning process. The routing combines applications and network links into a sequence of processes and tasks to automatically accept data input and route data to one or more recipients. In block B470, an aircraft group is identified by a unique identifier. The payload for one or more aircraft within the aircraft group is then determined in block B472.

A priority level, based on data type is assigned. In block B474, a routing path for payload delivery is determined, based on the priority level. The routing path may use best efforts utilizing available links, including Wi-Fi, cellular, satellite, ground wireless network or any other network type. The routing path may also select the shortest time using all the available network links. In another aspect, a least cost based path is selected based on a threshold cost defined by an airline. In block B476, the priority level for the media type is also assigned to each associated dropbox.

Figure 5A:
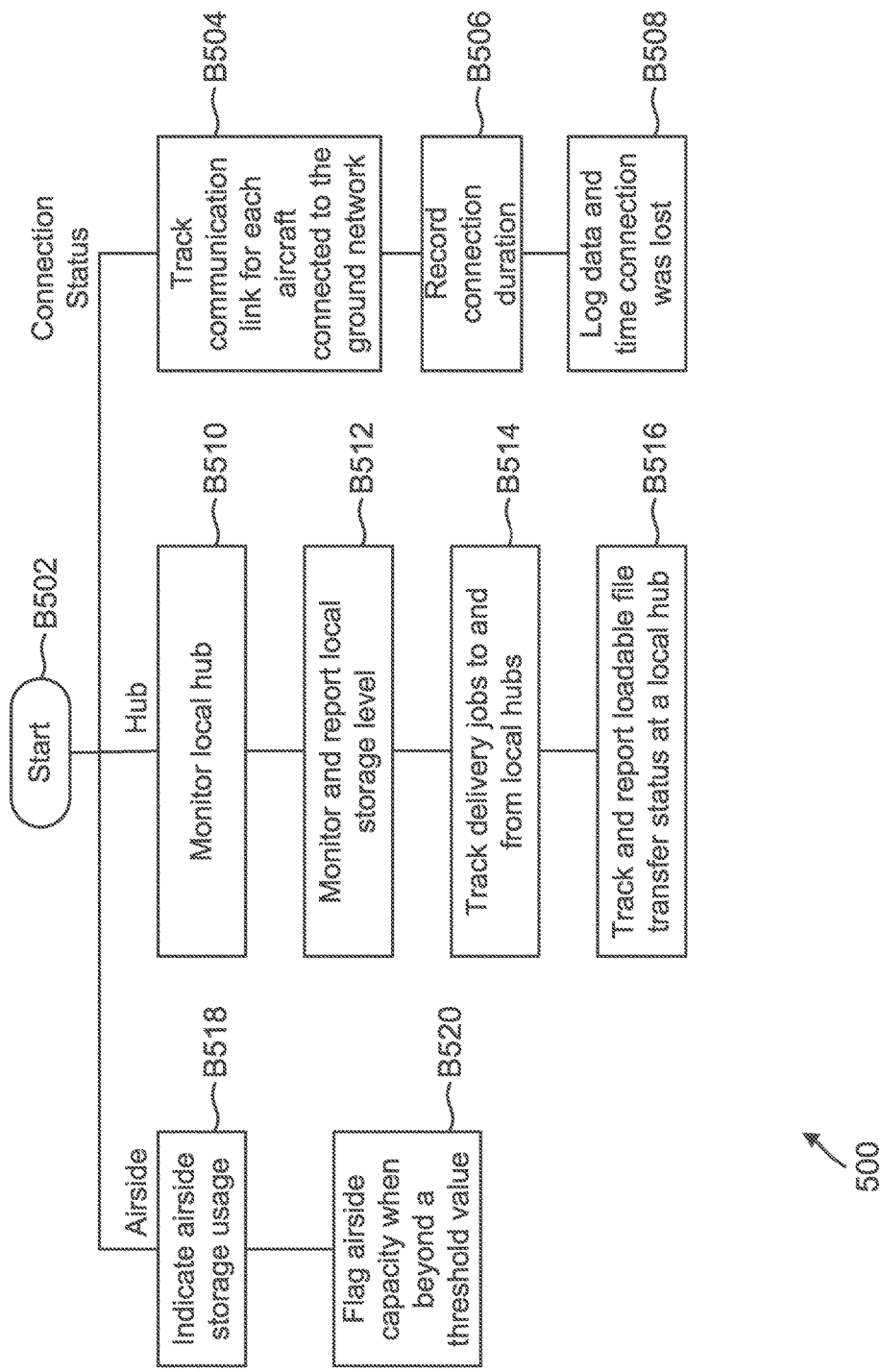
FIG. 5A shows a monitoring process, according to one aspect of the present disclosure.

FIG. 5A shows a process 500 for monitoring and reporting aircraft connection status with a ground network, local hub status and airside storage status, in one aspect. It is noteworthy that these components are monitored independently and in any sequence. The monitoring is managed by the job monitoring module 326 and the reporting may be executed by the reporting module 325. It is noteworthy that modules 326 and 325 may be integrated into a single module.

The process starts in block B502, when various components of system 300 are operational. In block B504, each aircraft connected to the ground network as a mobile distribution point is tracked. The communication link used by each aircraft is recorded and stored at a data structure (for example, 307). The connection duration is also recorded in block B506. When the connection is lost, the job monitoring module 326 logs the date and time in block B508 and stores the logged information at a data structure.

In block B510, the job monitoring module 326 monitors the status of local hubs within the distribution network 330. The process monitors the status of each hub. When a hub goes offline, an appropriate notification may be generated.

In block B512, the storage utilization level of each local storage device 336 is tracked and reported. In one aspect, in block B514, delivery jobs for data transfer from and to the local hubs is tracked based on different manifests. The loadable files at a local hub are visible via an interface. In block B516, when data is being transferred to one or more aircraft, the transfer status is tracked. If a hub goes offline, then the impact of the associated delivery jobs is ascertained and reported.

In block B518, the airside storage capacity is continuously monitored. If the storage capacity reaches a certain threshold, then in block B520, the storage capacity is reported.

In one aspect, the computing technology used by process 500 enables a user to select an aircraft and a time period and to obtain information regarding a network connection start and end time, communication link type that is used, data transfer start and stop time, data throughput, payload history, payload type, total data size that is offloaded, total data size that is uploaded, and/or number of files uploaded. This information may be stored at data structure 307. The report will indicate periods of inactivity. The flight information is associated with the connection history, including flight number, departure airport, departure time, arrival airport and arrival time.

Figure 5B:
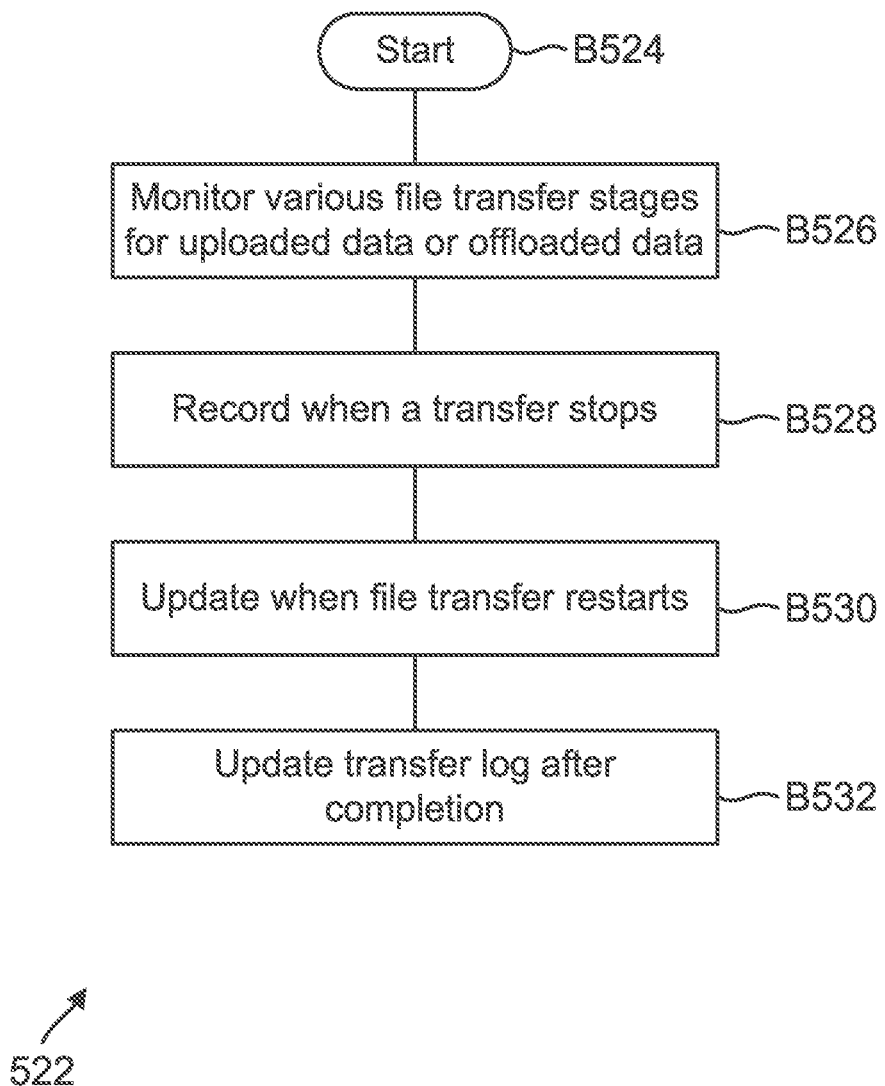
FIG. 5B shows a process for monitoring file transfer, according to one aspect of the present disclosure.

FIG. 5B is a high level process 522 for monitoring file transfer to or from an aircraft, according to one aspect of the present disclosure. The process begins in block B524. In block B526, the process monitors the various stages of file transfer. The various stages may be defined as: "Submitted": when the file is requested for distribution; "Staged": when the file is stored and waiting for distribution; "Stage Failed": when the system failed to acquire or stage the file before transfer: "Transferring": when the file is being currently transferred using a network link (Wi-Fi, Ku, Cellular or other): "Transfer Failed": when file transfer failed; "Paused": when file transfer was partial and paused; "Received"" when the file was successfully received by the destination; "Acknowledged": when file receipt was successfully acknowledged; and "Acknowledge Failed": when no response was received from an intended file recipient. The job monitoring module 326 update the amount of data that is transferred within a unit of time, for example, every minute. If the transfer stops, then the process records the time in block B528. The status is updated when the transfer restarts in block B530. After successful/unsuccessful transfer, a status log stored at data structure 307 is updated in block B532. If a file cannot be transferred within a certain duration due to payload type and expiration parameters (for example, due to flight times), the process records the status as failed.

Figure 5C:
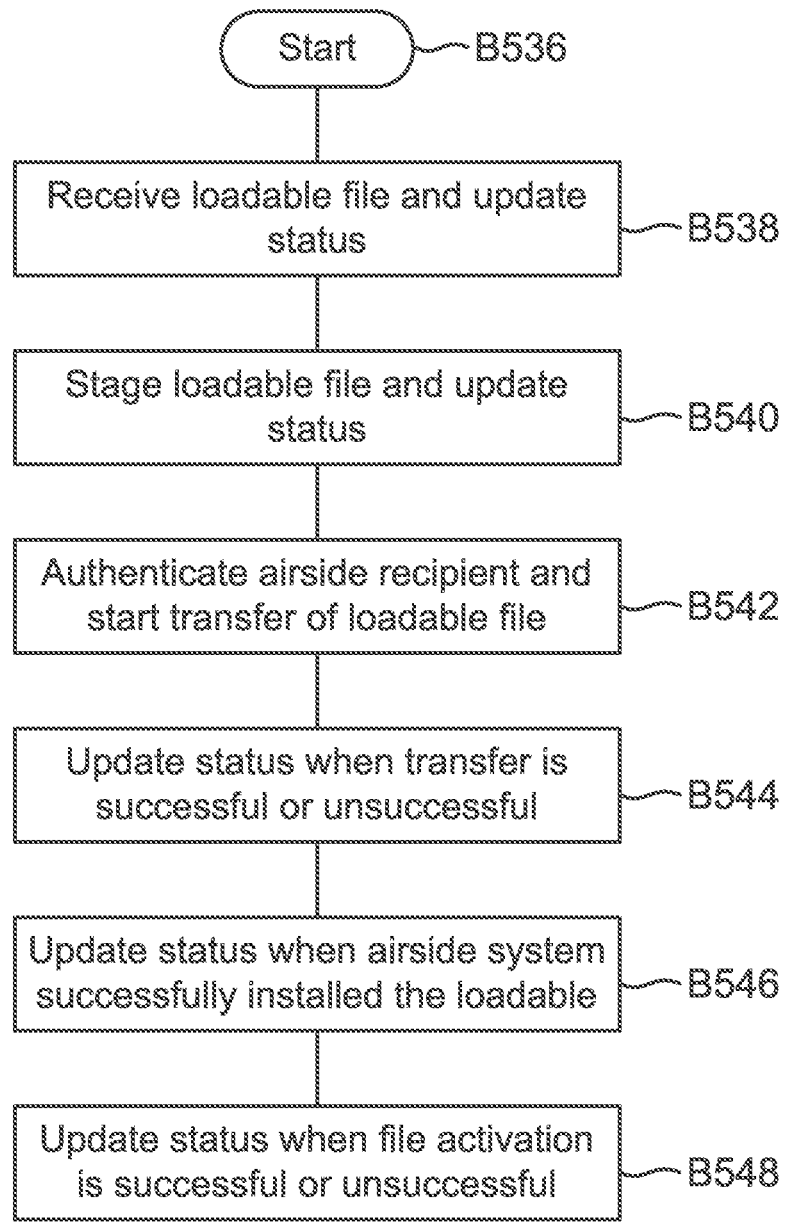
FIG. 5C shows another process for monitoring status of loading a file to an aircraft, according to one aspect of the present disclosure.

FIG. 5C shows a detailed process 534 for monitoring status of an aircraft loadable file, according to one aspect of the present disclosure. The process begins in block B536. A loadable file producer supplies loadable files or software/firmware for one or more LRUs. The loadable files are processed at a groundside location and then distributed to the airline fleet via a network connection, as described above. Once the packet is uploaded, the file is unpacked and installed at the intended location. The file is activated and used by the aircraft system. The monitoring process tracks the entire process, stores the information at a data structure (e.g. 307) and provides the information for better managing content at aircraft.

The process begins in block B536. In block B538, a loadable file is received from a data producer. The file may be received via an API. The data producer is identified. The status of the file is changed to "submitted".

In block B540, the loadable file is staged at a local hub. If successful, the status is changed to "staged", otherwise the status is updated to "staging failed".

Upon successful staging and/or successful retries, in block B542, the airside agent (or recipient) is identified and authenticated. After the authentication, the transfer process starts. If the transfer process is successful, then the status is updated to indicate the successful transfer in block B544. If unsuccessful, the status is updated to indicate the same.

When data is successfully transferred, the system may wait to seek an acknowledgement from the airside agent. The status is updated when an acknowledgement is received or not received. After successful acknowledgement, the process updates the status in block B546, when the loadable file is either successfully or unsuccessfully installed. In block B548, the status is again updated when the loadable file is either successfully activated by the airside agent 346 or if activation failed.

Process 534 enables a user to filter data to view transfers that are in progress at any given time. The status may be obtained based on an aircraft, aircraft group, manifest identifier, local hub identifiers, specific network links or any other identifiers. The monitoring notifies a user if a current data transfer rate at a local hub is at a maximum allowable rate or below a minimum threshold level. The process provides an indication of remaining time to complete a transfer from a local hub to an aircraft.

Figure 5D:
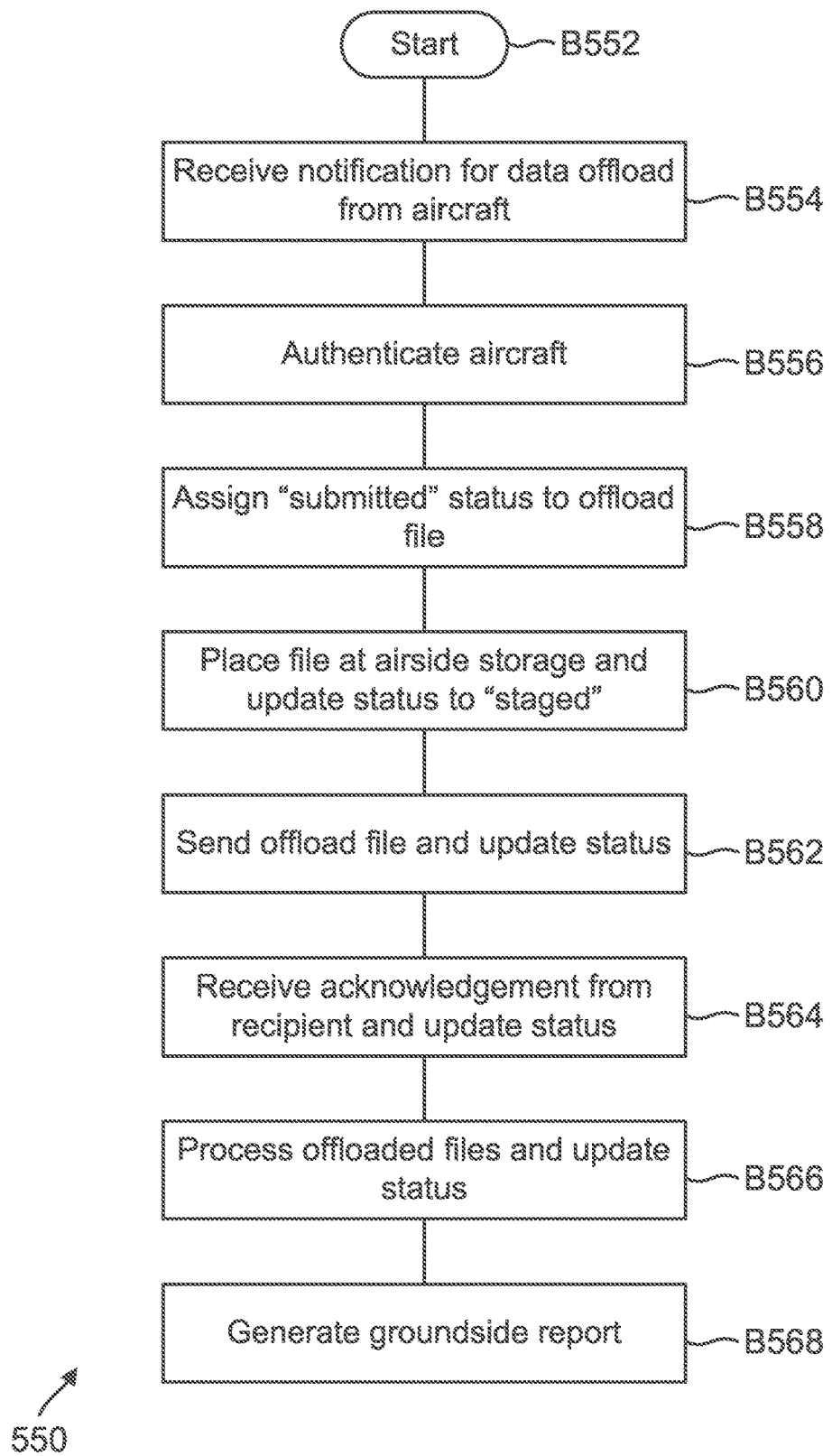
FIG. 5D shows a process for tracking data offload from an aircraft, according to one aspect of the present disclosure.

FIG. 5D shows a process 550 for monitoring offloading of data files from an aircraft, according to one aspect of the present disclosure. An offload data producer is typically an airside application that is executed on the aircraft and generates data files for a groundside recipient. The data may include passenger usage data of in-flight media and applications. The process begins in block B552 to track the offload process when the data producer notifies that a data file is ready to be offloaded.

In block B554, the airside application notifies a groundside recipient that one or more data files are ready for offload. The aircraft/application is authenticated in block B556. The status of the data files is updated to "submitted" in block B558. The data files are then staged at airside storage 348 and in block B560, the status is updated to "staged". If the staging is unsuccessful, for example, due to lack of storage capacity, then the status is updated to "stage failed". In block B562, the data files are offloaded to the groundside recipient. The status is updated to "acknowledged" when a successful acknowledgement is received. Once the groundside recipient is successful in processing the offloaded data, the status is updated in block B566 to "processed". If there is a processing error, the status is updated to "processing failed". Once the recipient activates the file successfully, the status is updated to "activated". If the activation failed, the status is updated to "activation failed".

Thereafter, a groundside report may be generated by the reporting module 325 in block B568. The report provides a most recent status of files that are planned to be transferred, are being transferred and confirmed received by the recipients. In one aspect, the user interface 323 enables a user to select an aircraft and obtain information regarding the payload type, payload priority, file name, file version, date/time submitted, data recipient, file status, file size and percentage complete at any given time. A flight number may also be provided. The flight status includes submitted, staged, stage failed, transferring, paused, transfer failed, received, acknowledged, acknowledgement failed, processed, processing failed, activated and activation failed.

In one aspect, using process 550, the user is able to select a payload type for an aircraft group and obtain fleet level information for a given time period. The information includes, number of files submitted, files staged, stage failed, paused, transfer failed, files received, acknowledged, acknowledgement failed and average file age which is determined by a duration when the file is submitted and just prior to acknowledged status.

Process 550 also enables a user to filter status based on an airline, aircraft group, individual aircraft, assignment identifier, dropbox, recipient identifier and other custom fields that can be defined by a user.

Figure 5E:
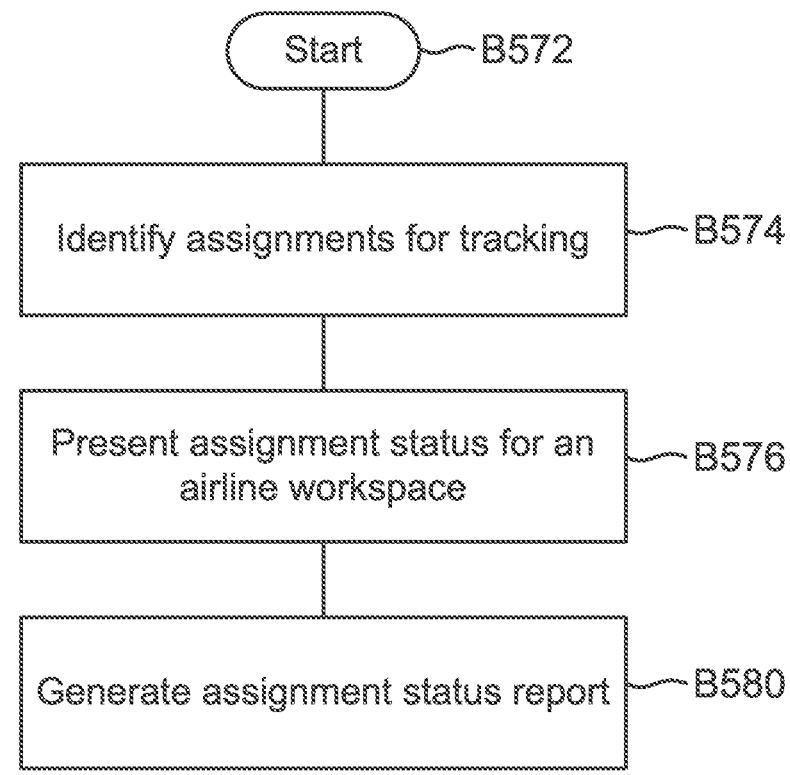
FIG. 5E shows a process flow for tracking assignments, according to one aspect of the present disclosure.

FIG. 5E shows process 570 for tracking and reporting assignment status, according to one aspect of the present disclosure. The status of assignments includes "created", "approval in progress", "completed", "archived" and "error". The process begins in block B572 when a user using a user interface communicates with the management module 304. In block B574, a plurality of assignments are identified. In block B576, the assignments are filtered based on airline workspace. An assignment report is generated in block B580. The report may include an assignment ID, airline priority level, delivery date and time and status. The user is able to filter the data by an aircraft group, individual aircraft, entire airport or group of airports. The report may also provide loadable file transfer status including loadable file ID, recipient, loadable file transfer in progress and/or staged.

Figure 6A:
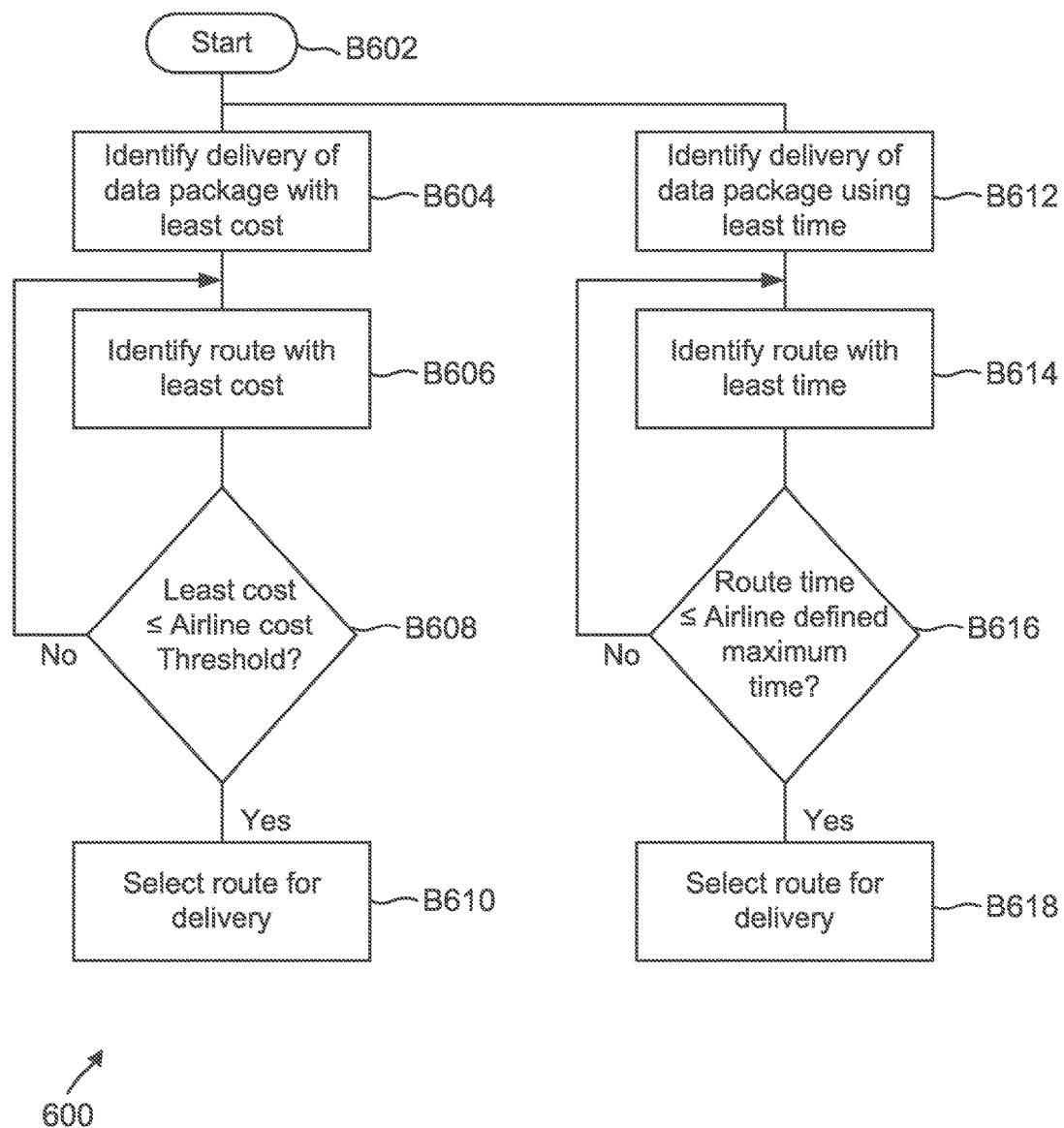
FIG. 6A shows a process for route selection, according to one aspect of the present disclosure.

FIG. 6A shows an example of a process 600 for using a route based on cost and/or least delivery time, using the innovative computing technology of system 300 described in detail above. The process begins in block B602, when the need to transfer data to one or more aircraft has been determined, either using a manifest or on-demand. The data package and the associated aircraft are identified in block B604. This may be performed by the routing module 316.

In one aspect, in block B606, a route with the least cost is identified. The aircraft flight schedule is electronically obtained from the airline or any other entity. The information regarding the costs may be stored at data structure 307. The cost information includes average cost of per unit (for example, byte) data transfer using a network link, for example, a Ku link (via satellite interface 344), Cellular link (via cellular interface 340), Wi-Fi link (via Wi-Fi interface 342) or any other link type. The network routing equipment cost (for example, for switches, servers, routers, adapters and others) may also be considered to determine an average base cost. The routing module 316 computes the cost for transferring the data package using a combination of one or more links and identifies a least cost option.

In block B608, the process determines if the least cost meets a threshold value specified for an airline. This information may also be stored at data structure 307.

If not, then the process reverts back to block B606 to identify a next least cost option. In one aspect, the process is iterative until a desired result is achieved.

When the appropriate least cost route is identified, the routing module 316 in block B610, obtains information regarding an airline preferred route that is different from the least cost route. The airline preferred route may be specified by the airline and stored as airline configuration data. The least cost and the cost of using the airline preferred route is then determined. The delivery times for using the least cost route and the airline preferred route are also determined. Based on that either the least cost or the airline preferred route is selected in block B610 for delivering the data package.

In block B612, the data package using least delivery time is identified.

In block B614, a route with a least delivery time is ascertained. This information is determined by first obtaining the flight schedule for the airline fleet that is the intended recipient of the data package. The routing module 316 determines an average time for delivering the package using different network links, for example, Ku link, cellular, Wi-Fi links and others. The routing module 316 obtains historical availability of the network resources (for example, servers, switches, adapters and other nodes) used for staging the data package for delivery. The historical data regarding throughput involving the various network nodes for different routes is also obtained. This information is stored using the process of FIG. 6C, described below in more detail. The delivery time for the data package using each possible route is then determined. The route with the least delivery time is then identified.

In block B616, the route with the least delivery time is compared with a maximum time that may have been specified for the specific airline. A preferred route for the airline is obtained by the routing module 316 for the comparison. A deadline for delivering the content is determined, for example, based on when the airline plans to refresh the content on the aircraft. The time difference between the least time route and the preferred route is then determined. The cost associated for the least time and the preferred routes is also determined, as described above. Thereafter, an optimum route is selected for delivery based on the least time, preferred route delivery time and the associated cost.

Figure 6B:
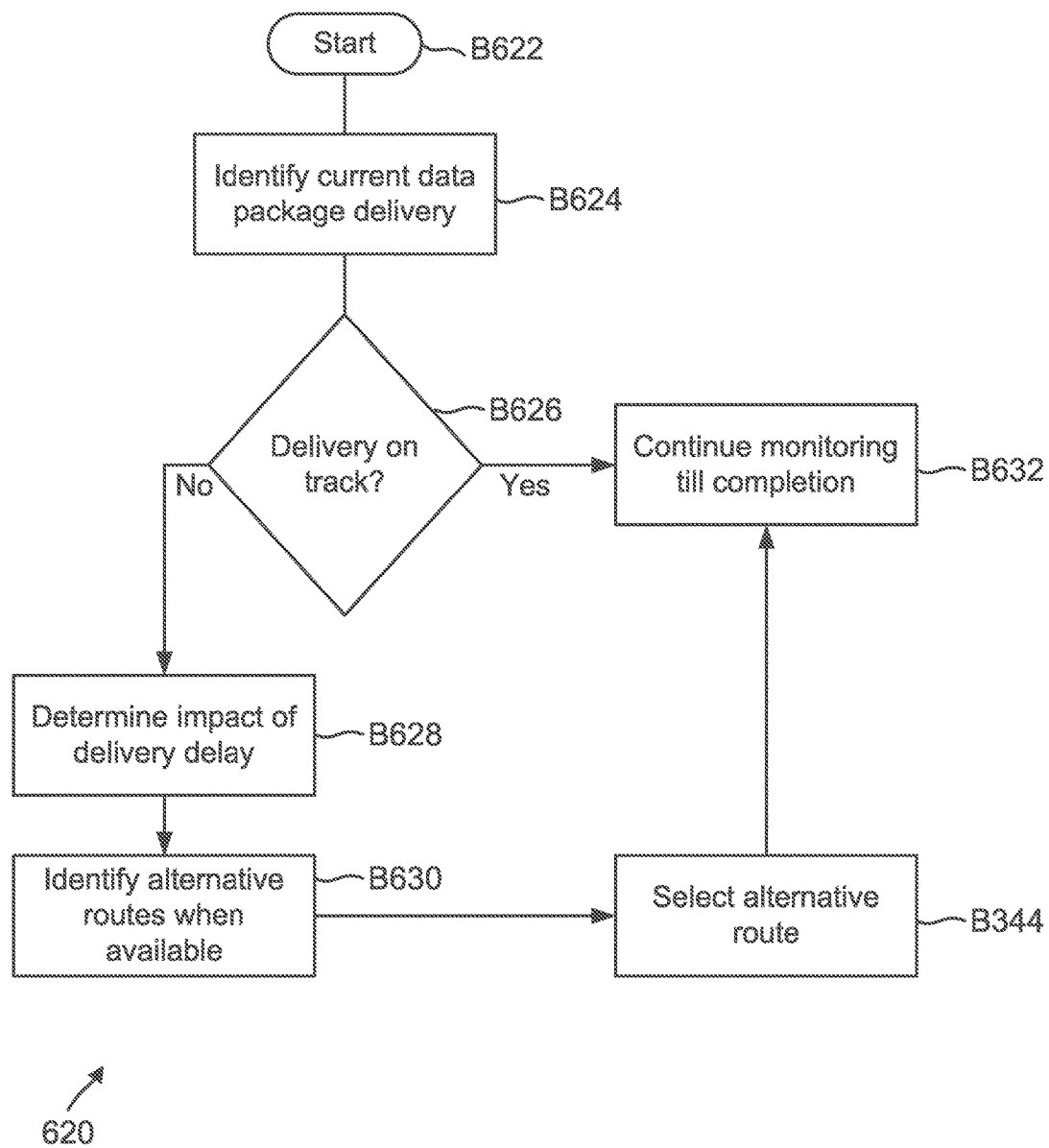
FIG. 6B shows a process for adjusting routes, according to one aspect of the present disclosure.

FIG. 6B shows a process 620 for monitoring data delivery jobs and then automatically adjusting routes in real time based on cost and delivery time, according to one aspect of the present disclosure. The process begins in block B622 when a route has already been selected for data delivery and a data delivery job is being executed using one or more network links. A current delivery job is identified in block B624. The job may be identified by the system automatically based on configured parameters, for example, data package content type, priority level or otherwise.

In block B626, the process determines if the data delivery via one or more network links is on track. The job monitoring module 326 may track the data delivery as a percentage completed to one aircraft and when applicable, an aircraft fleet. The progress is assessed with respect to delivery time and cost. Time delay and cost overruns are estimated based on the throughput rates.

When delivery is behind schedule, then in block B628, the process determines the cause for delivery delay by verifying network status and evaluating aircraft connection history compared with historical connection data. The impact of the delay is also ascertained. To determine the impact, the payload type information and the airline priority to the payload type is obtained by the process. The operational impact of delayed delivery or delivery outside permitted/ planned cost is determined. The impact of the delivery or cost overrun is quantified.

Based on the impact and if the impact has reached a threshold vale, an alternate route may be selected in block B634. The threshold value may be pre-defined for the airline/aircraft. To determine the alternate route, the delivery time for when the data package has to be delivered is obtained. This information may be obtained from the airside manifest. The process determines if an airline may be willing to pay more for the data delivery (i.e. a cost threshold) and if yes, then the extra amount that the airline is willing to pay for the delivery is determined. The network conditions and other assigned payload information for the alternate routes is obtained. The additional cost for each route is also obtained, if the objective is to deliver on time. The additional time for an alternate route is ascertained if the objective is to stay within budget. Based on cost/time constraints, the alternate route is selected and the process moves to block B632.

In block B632, the alternate route or the original, on-track route is continuously monitored for on-time and/or below cost data delivery.

Figure 6C:
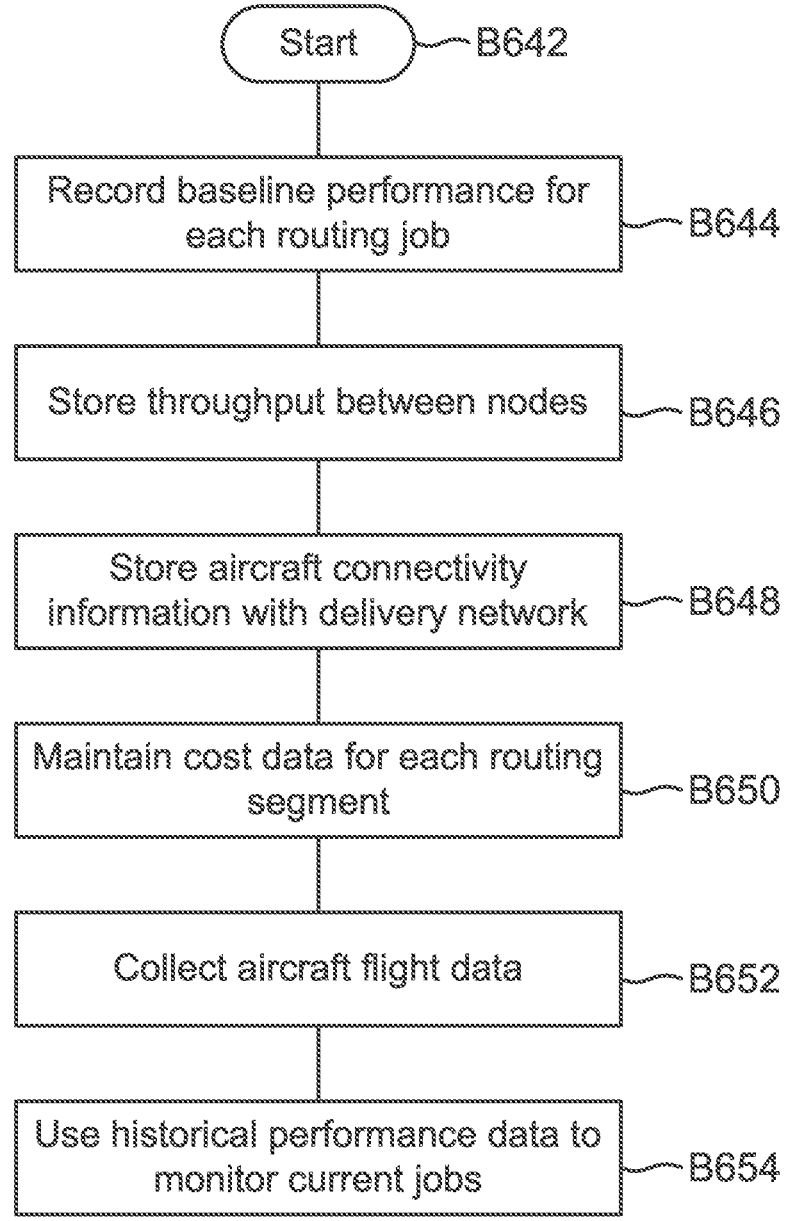
FIG. 6C shows a process for developing a knowledge based data structure, according to one aspect of the present disclosure.

FIG. 6C shows a process 640 for developing a historical knowledge base, for example, at data structure 307, for better managing data package delivery to and from aircraft, according to one aspect of the present disclosure. Process 640 begins in block B642, when certain threshold amount of data has been collected to forecast performance for data delivery. This is based on storing various parameters described in blocks B644-B652.

In block B644, a baseline performance for each segment within a route is stored. The segments may include wired and wireless connections. The actual throughput (i.e. amount of data transferred) between two nodes for various routes is also recorded in block B646. In block B648, the aircraft connection time to the distribution network 330 for different aircraft is recorded.

In block B650, the cost data for each segment of a routing path is stored. In block B652, the aircraft flight schedules and ground layover location and duration are also stored. The information collected and stored from blocks B644-B652 is used to build a historical knowledge base that can be used in block B654 to efficiently monitor and manage delivery performance, for example, as described above with respect to FIG. 6B.

The systems and processes described herein provide automatic routing to deliver content to multiple destinations, for example, an airline fleet. The system 300 components determine optimal routes based on priority, target deliver time, cost, management policies and business rules. The delivery and routing is adjusted automatically, especially when a preferred route is not feasible. The users may only be informed when a cost or time threshold is reached.

In one aspect, each data delivery job is monitored for time and cost. The job are monitored in real-time and a status is reported. A continuous knowledge based data structure is built based on real-time collected data so that network resources and data delivery can be efficiently managed.

In one aspect, a machine implemented method, is provided. The method includes configuring by a processor a virtual workspace for managing data loading and data offloading to and from a transportation vehicle; associating an approval policy for any instruction set used for loading and offloading data; generating by the processor a master instruction set with a routing plan for loading data to and from the transportation vehicle using one or more networking links; assigning by the processor an intermediate storage location for storing loadable file data based a local instruction set; creating by the processor a transportation side instruction set for loading and offloading data from the transportation vehicle, the transportation side instruction set being based on the master instruction set; using the master instruction set, the local instruction set and the transportation side instruction set by the processor to automatically load data to and from the transportation vehicle using the one or more network links to meet an objective of the master instruction set; and monitoring data loading to and from the transportation vehicle for making any changes to meet an objective of the master instruction set based on delivery time, cost or both delivery time and cost.

In another aspect, a machine implemented method is provided. The method including associating a virtual workspace to an airline by a processor for managing data loading and data offloading to and from an aircraft; generating by the processor a master instruction set with a routing plan for loading data to and from the aircraft using one or more networking links; generating by the processor an airside side instruction set for loading and offloading data from the aircraft; using the master instruction set, a local instruction set for a local hub of a distribution network and the airside instruction set by the processor to automatically load data to and from the aircraft using the one or more network links to meet an objective of the master instruction;

and monitoring data loading to and from the aircraft by the processor for making any changes to meet an objective of the master instruction set based on delivery time, cost or both delivery time and cost.

In yet another aspect, a machine implemented method is provided. The method including monitoring by a processor a data loading operation for loading data to an aircraft using a network link from among a plurality of network links; determining by the processor that the data loading operation completion is not likely to meet a target delivery time for the aircraft; based on a data type and a priority associated with the data, determining by the processor an impact of not meeting the delivery time; and identifying an alternate delivery route when the impact reaches a threshold value, the alternate delivery route being configured to deliver the data within the target delivery time without violating a cost threshold defined for the aircraft.

Figure 7:
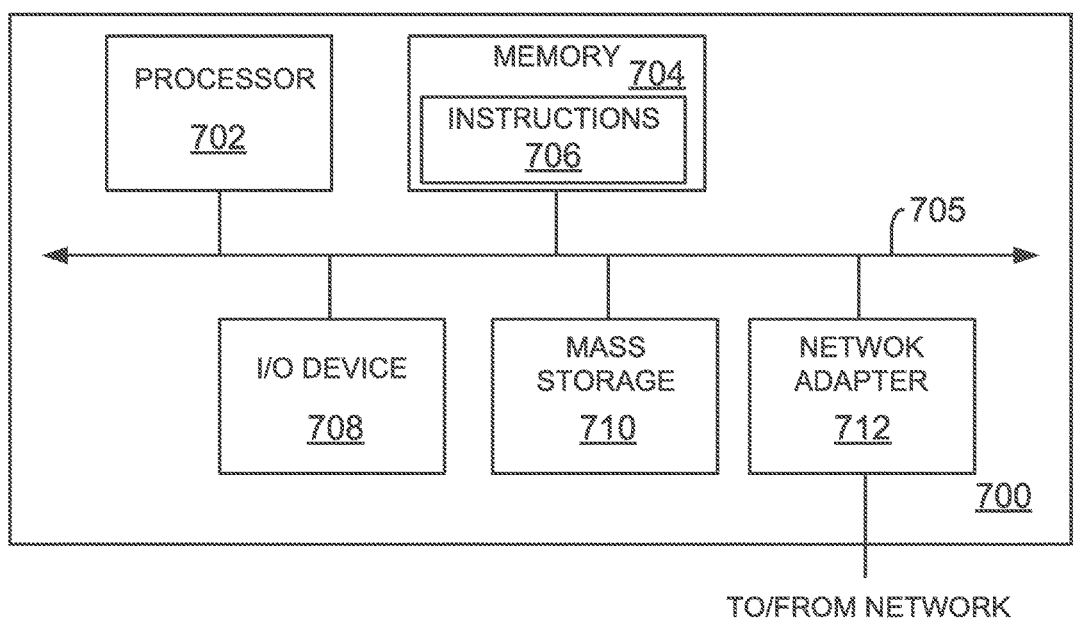
FIG. 7 shows a block diagram of a computing system, used according to one aspect of the present disclosure.

Processing System:

FIG. 7 is a high-level block diagram showing an example of the architecture of a processing system 700 that may be used according to one aspect. The processing system 700 can represent user console 302, management module 304, local hubs 332, airside agent 346, groundside agent 356, media server 112, computing system 106, WAP 130, or any user device that attempts to interface with a vehicle computing device. Note that certain standard and well-known components which are not germane to the present aspects are not shown in FIG. 7.

The processing system 700 includes one or more processor(s) 702 and memory 704, coupled to a bus system 705. The bus system 705 shown in FIG. 7 is an abstraction that represents any one or more separate physical buses and/or point-to-point connections, connected by appropriate bridges, adapters and/or controllers. The bus system 705, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 702 are the central processing units (CPUs) of the processing system 700 and, thus, control its overall operation. In certain aspects, the processors 702 accomplish this by executing software stored in memory 704. A processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 704 represents any form of random access memory (RAM), read-only memory (ROM), flash memory, or the like, or a combination of such devices. Memory 704 includes the main memory of the processing system 700. Instructions 706 may be used to implement the process steps of FIGS. 3B-3D, 4A-4E, 5A-5E and 6A-6C described above in detail.

Also connected to the processors 702 through the bus system 705 are one or more internal mass storage devices 710, and a network adapter 712. Internal mass storage devices 710 may be, or may include any conventional medium for storing large volumes of data including data structure 307 in a non-volatile manner, such as one or more magnetic or optical based disks, flash memory, or solid-state drive.

The network adapter 712 provides the processing system 700 with the ability to communicate with remote devices (e.g., over a network and may be, for example, an Ethernet adapter or the like.

The processing system 700 also includes one or more input/output (I/O) devices 708 coupled to the bus system 705. The I/O devices 708 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for managing content loading and offloading to and from a transportation vehicle are provided. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
configuring by a processor a virtual workspace for managing data loading and data offloading to and from a transportation vehicle;
associating an approval policy for any instruction set used for loading and offloading data;
generating by the processor a master instruction set with a routing plan for loading data to and from the transportation vehicle using one or more networking links;
assigning by the processor an intermediate storage location for storing loadable data based a local instruction set;
creating by the processor a transportation side instruction set for loading and offloading data from the transportation vehicle, the transportation side instruction set being based on the master instruction set;
using the master instruction set, the local instruction set and the transportation side instruction set by the processor to automatically load data to and from the transportation vehicle using the one or more network links to meet an objective of the master instruction set; and
monitoring data loading to and from the transportation vehicle for making any changes to meet an objective of the master instruction set based on at least one of delivery time, and cost.

2. The method of claim 1, wherein the transportation vehicle is an aircraft and the electronic data loaded to the aircraft is for an inflight entertainment system, and the network link is a wireless connection.

3. The method of claim 2, wherein the network link is a cellular link.

4. The method of claim 2, wherein the network link is a satellite link.

5. The method of claim 2, wherein the virtual workspace is for an airline and is created by partitioning a storage device.

6. The method of claim 5, wherein the virtual workspace is shared by at least two airlines.

7. The method of claim 1, wherein the transportation vehicle is one of a train, a bus, a ship and a recreation vehicle.

8. A machine implemented method, comprising:
associating a virtual workspace to an airline by a processor for managing data loading and data offloading to and from an aircraft;
generating by the processor a master instruction set with a routing plan for loading data to and from the aircraft using one or more networking links;
generating by the processor an airside side instruction set for loading and offloading data from the aircraft;

using the master instruction set, a local instruction set for a local hub of a distribution network and the airside instruction set by the processor to automatically load data to and from the aircraft using the one or more network links to meet an objective of the master instruction; and monitoring data loading to and from the aircraft by the processor for making any changes to meet an objective of the master instruction set based on at least one of delivery time and cost.

9. The method of claim 8, wherein the data loaded to the aircraft is for an inflight entertainment system, and the network link is a wireless connection.

10. The method of claim 9, wherein the network link is a cellular link.

11. The method of claim 9, wherein the network link is a satellite link.

12. The method of claim 8, wherein the virtual workspace is created by partitioning a storage device.

13. The method of claim 12, wherein the virtual workspace is shared by at least two airlines.

14. The method of claim 8, wherein the processor configures an intermediate storage location for storing loadable data based on the local instruction set.

15. A machine implemented method, comprising:
monitoring by a processor a data loading operation for loading data to an aircraft using a network link from among a plurality of network links;

determining by the processor that the data loading operation completion is not likely to meet a target delivery time for the aircraft;

based on a data type and a priority associated with the data, determining by the processor an impact of not meeting the delivery time; and identifying an alternate delivery route when the impact reaches a threshold value, the alternate delivery route being configured to deliver the data within the target delivery time without violating a cost threshold defined for the aircraft.

16. The method of claim 15, wherein the data loaded to the aircraft is for an inflight entertainment system, and the network link is a wireless connection.

17. The method of claim 15, wherein the network link is a cellular link.

18. The method of claim 15, wherein the network link is a satellite link.

19. The method of claim 15, wherein the processor determines an additional cost for the alternate delivery route and compares the additional cost to the cost threshold for the aircraft.

20. The method of claim 15, wherein for identifying the alternate delivery route, the processor uses a data structure that stores historical performance data for delivery jobs to the aircraft.

* * * * *